US012656903B2

(12) United States Patent
Dattalo

(10) Patent No.: US 12,656,903 B2
(45) Date of Patent: Jun. 16, 2026

(54) ADAPTIVE SCANNING USING CAPACITIVE SENSORS

(71) Applicant: Synaptics Incorporated, San Jose, CA (US)

(72) Inventor: Tracy Scott Dattalo, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/984,069

(22) Filed: Dec. 17, 2024

(65) Prior Publication Data

US 2025/0208729 A1     Jun. 26, 2025

Related U.S. Application Data

(60) Provisional application No. 63/612,430, filed on Dec. 20, 2023.

(51) Int. Cl.
*G06F 3/041*     (2006.01)
*G01D 5/24*     (2006.01)
*G06F 3/044*     (2006.01)

(52) U.S. Cl.
CPC ........... *G06F 3/04166* (2019.05); *G01D 5/24* (2013.01); *G06F 3/0446* (2019.05)

(58) Field of Classification Search
CPC .. G06F 3/04166; G06F 3/0446; G06F 3/0445; G01D 5/24
See application file for complete search history.

(56) References Cited

U.S. PATENT DOCUMENTS

| | | | | |
|---|---|---|---|---|
| 11,029,780 B1 * | 6/2021 | Goudarzi | ............ | G06F 3/04166 |
| 11,635,848 B2 | 4/2023 | Goudarzi et al. | | |
| 2012/0013546 A1 * | 1/2012 | Westhues | ............ | G06F 3/04182 345/173 |
| 2012/0013565 A1 * | 1/2012 | Westhues | .............. | G06F 3/0446 345/174 |
| 2013/0335252 A1 * | 12/2013 | Roberson | ............ | G06F 3/04166 341/173 |
| 2014/0092051 A1 * | 4/2014 | Weinerth | .............. | G06F 3/0443 345/174 |
| 2015/0091838 A1 * | 4/2015 | Tanemura | ............. | G06F 3/0446 345/174 |
| 2015/0378467 A1 * | 12/2015 | Hoch | .................... | G06F 3/0443 345/174 |

(Continued)

*Primary Examiner* — Amy Onyekaba
(74) *Attorney, Agent, or Firm* — Leydig, Voit & Mayer, Ltd.

(57)     ABSTRACT

A method for performing a scanning process using adaptive scanning, comprising: driving, by a processing system of an input device, one or more of a first set of electrodes to generate first sensing signals that are detectable by a second set of electrodes; obtaining first resulting signals associated with the first sensing signals via the second set of electrodes; determining, based on the first resulting signals, a first subset of the second set of electrodes that detected an input object on a display device; driving one or more of the first subset of the second set of electrodes that detected the input object to generate second sensing signals that are detectable by the first set of electrodes; and obtaining second resulting signals associated with the second sensing signals via the first set of electrodes.

20 Claims, 24 Drawing Sheets

(56)     References Cited

U.S. PATENT DOCUMENTS

| | | | |
|---|---|---|---|
| 2016/0148034 A1* | 5/2016 | Kremin | G06V 40/1306 |
| | | | 382/124 |
| 2016/0162102 A1* | 6/2016 | Shahparnia | G06F 1/3215 |
| | | | 345/174 |
| 2016/0291718 A1* | 10/2016 | Cho | G06F 3/0446 |
| 2016/0291765 A1* | 10/2016 | Shen | G06F 3/04164 |
| 2016/0291766 A1* | 10/2016 | Shen | G06F 3/04166 |
| 2017/0177113 A1* | 6/2017 | Shen | G06F 3/0446 |
| 2017/0242523 A1* | 8/2017 | Hoch | G06F 3/04144 |
| 2018/0188842 A1* | 7/2018 | Kwon | G06F 3/041661 |
| 2018/0204037 A1* | 7/2018 | Hargreaves | G06V 40/1306 |
| 2019/0064956 A1* | 2/2019 | Tanemura | G06F 3/04166 |
| 2019/0068189 A1* | 2/2019 | Bohannon | H03K 17/962 |
| 2019/0087029 A1* | 3/2019 | Shepelev | G02F 1/13338 |
| 2019/0138148 A1* | 5/2019 | Kwon | G06F 3/0416 |
| 2019/0339809 A1* | 11/2019 | Hoch | G06F 3/04166 |
| 2021/0103360 A1* | 4/2021 | Manca | G06F 3/0418 |
| 2021/0286470 A1* | 9/2021 | Takada | G06F 3/0445 |
| 2022/0050548 A1* | 2/2022 | Goudarzi | G01V 3/088 |
| 2023/0004206 A1* | 1/2023 | Vandermeijden | G06F 3/0418 |

* cited by examiner

306

Computing Device
350

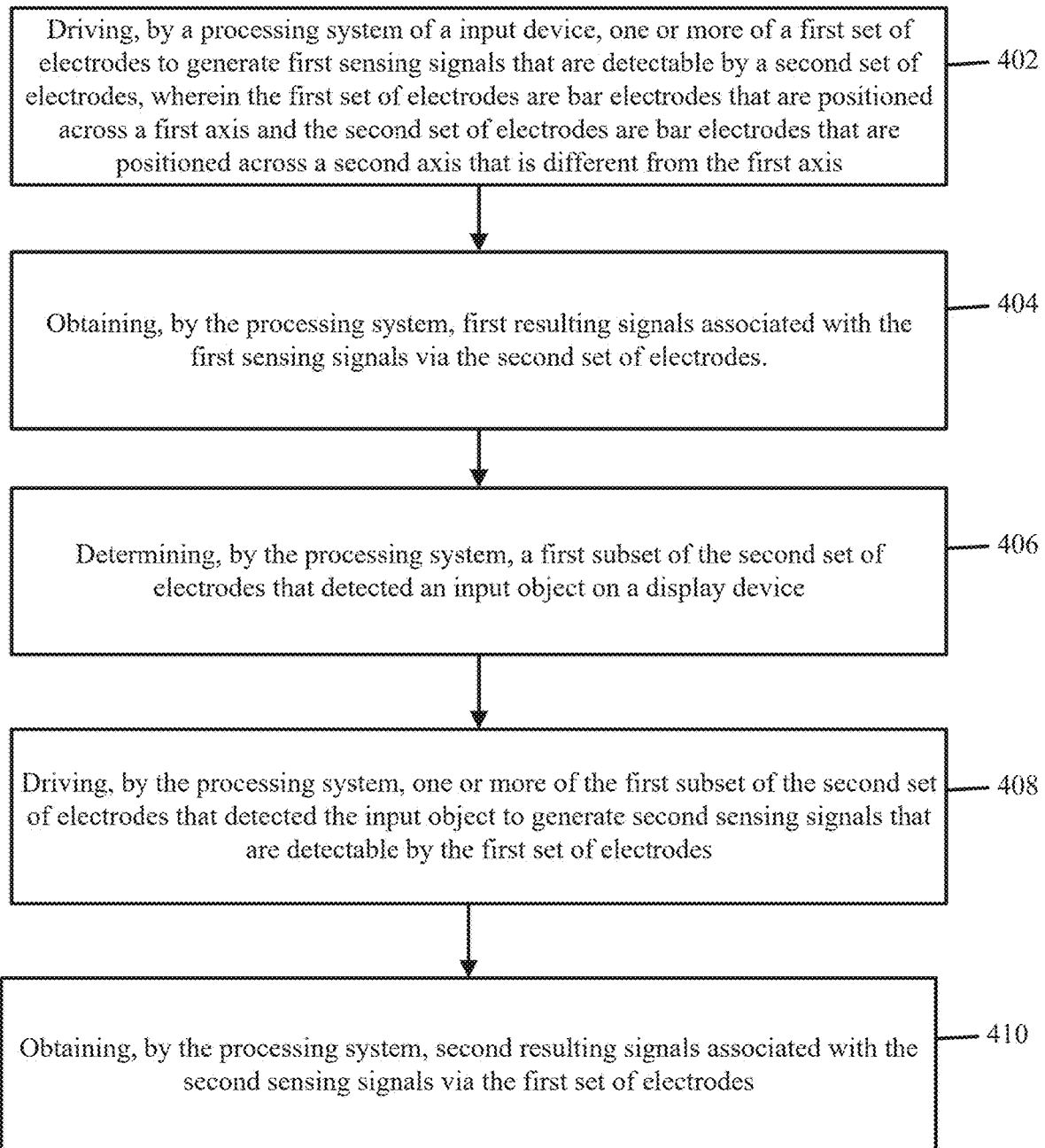

Driving, by a processing system of a input device, one or more of a first set of electrodes to generate first sensing signals that are detectable by a second set of electrodes, wherein the first set of electrodes are bar electrodes that are positioned across a first axis and the second set of electrodes are bar electrodes that are positioned across a second axis that is different from the first axis — 402

Obtaining, by the processing system, first resulting signals associated with the first sensing signals via the second set of electrodes. — 404

Determining, by the processing system, a first subset of the second set of electrodes that detected an input object on a display device — 406

Driving, by the processing system, one or more of the first subset of the second set of electrodes that detected the input object to generate second sensing signals that are detectable by the first set of electrodes — 408

Obtaining, by the processing system, second resulting signals associated with the second sensing signals via the first set of electrodes — 410

All
Negative

704

Coded
Drive

706

All
Positive

All
Negative

704

Coded
Drive

706

All
Positive

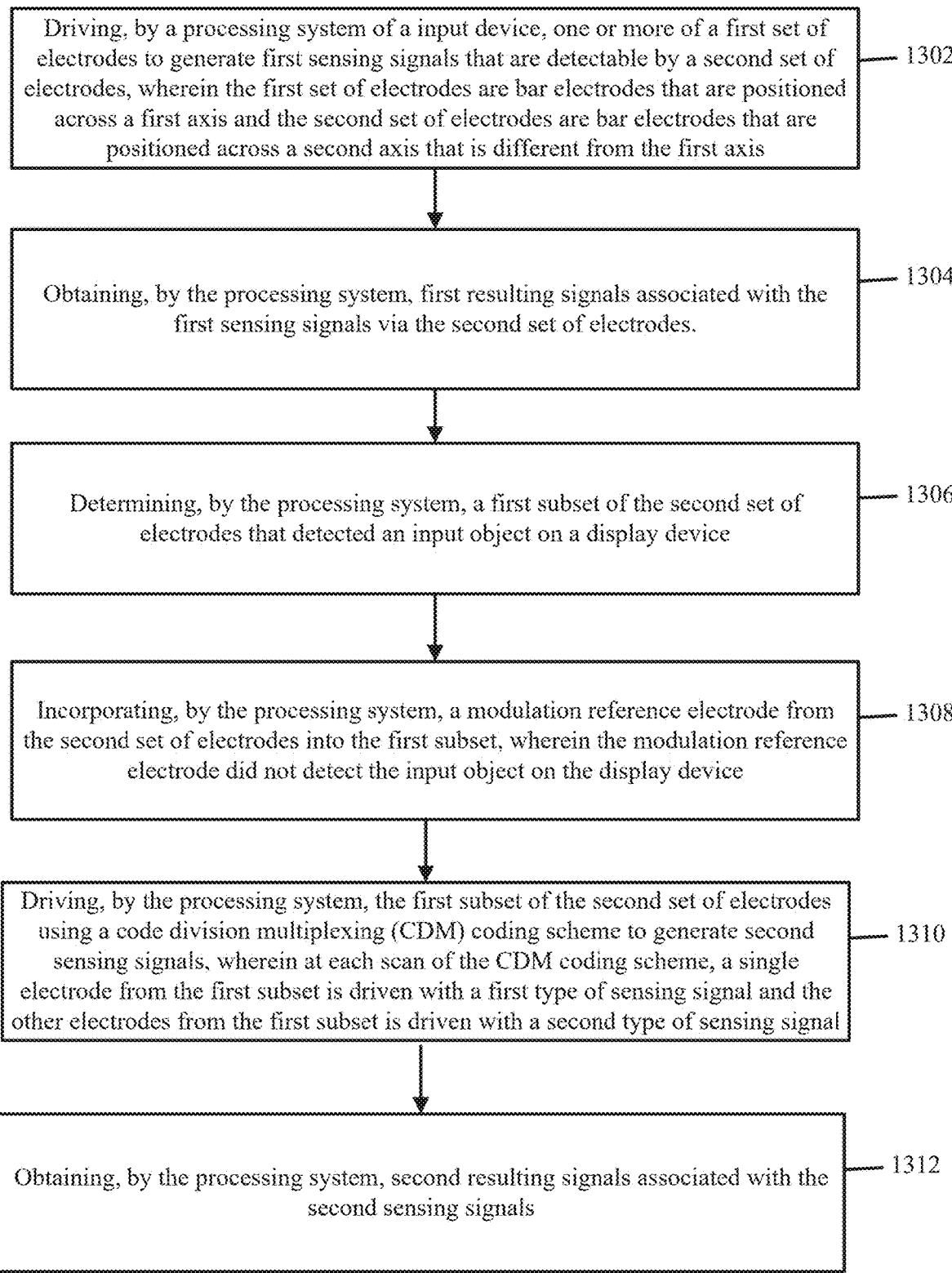

Driving, by a processing system of a input device, one or more of a first set of electrodes to generate first sensing signals that are detectable by a second set of electrodes, wherein the first set of electrodes are bar electrodes that are positioned across a first axis and the second set of electrodes are bar electrodes that are positioned across a second axis that is different from the first axis —— 1302

Obtaining, by the processing system, first resulting signals associated with the first sensing signals via the second set of electrodes. —— 1304

Determining, by the processing system, a first subset of the second set of electrodes that detected an input object on a display device —— 1306

Incorporating, by the processing system, a modulation reference electrode from the second set of electrodes into the first subset, wherein the modulation reference electrode did not detect the input object on the display device —— 1308

Driving, by the processing system, the first subset of the second set of electrodes using a code division multiplexing (CDM) coding scheme to generate second sensing signals, wherein at each scan of the CDM coding scheme, a single electrode from the first subset is driven with a first type of sensing signal and the other electrodes from the first subset is driven with a second type of sensing signal —— 1310

Obtaining, by the processing system, second resulting signals associated with the second sensing signals —— 1312

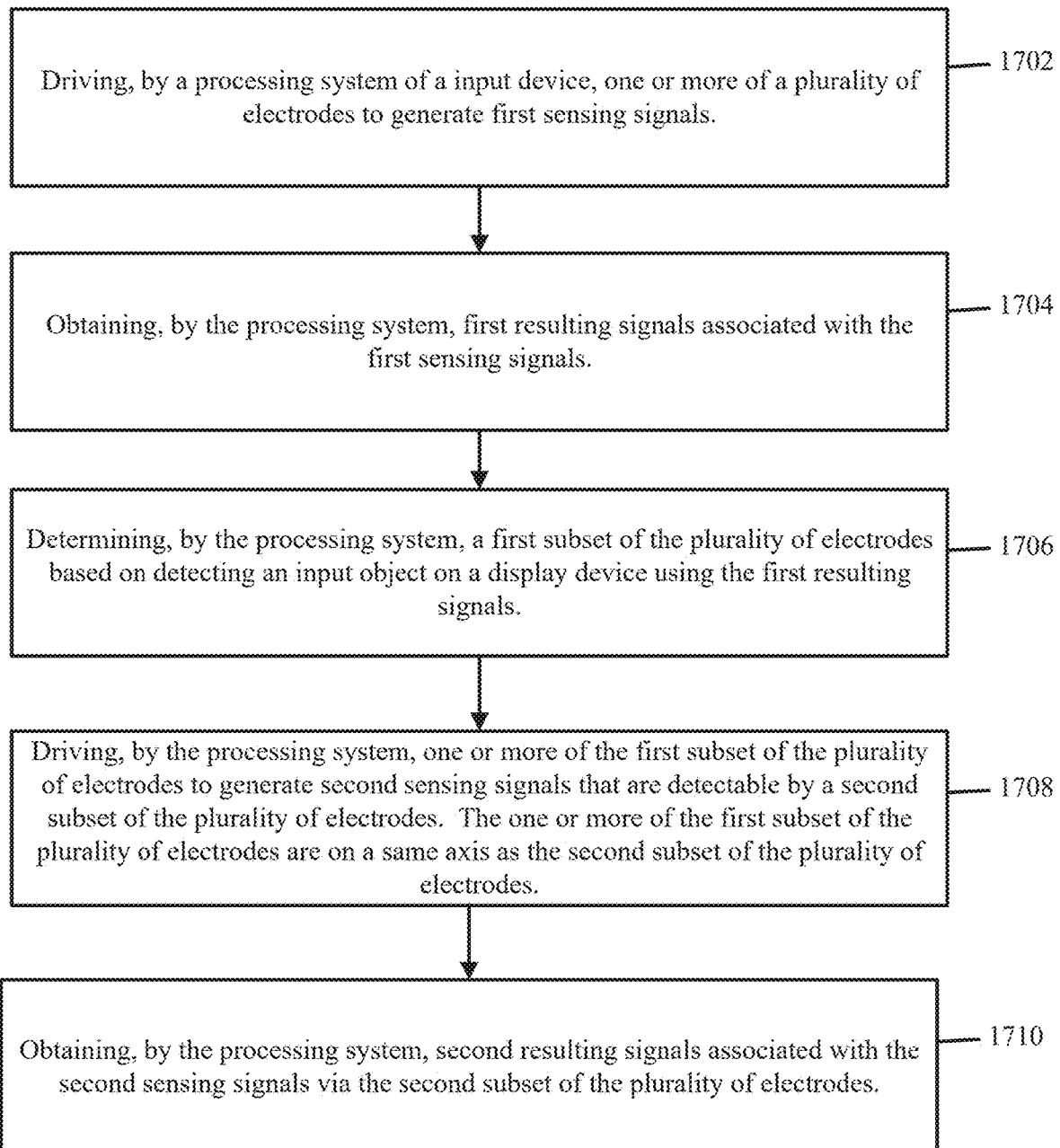

Driving, by a processing system of a input device, one or more of a plurality of electrodes to generate first sensing signals. — 1702

Obtaining, by the processing system, first resulting signals associated with the first sensing signals. — 1704

Determining, by the processing system, a first subset of the plurality of electrodes based on detecting an input object on a display device using the first resulting signals. — 1706

Driving, by the processing system, one or more of the first subset of the plurality of electrodes to generate second sensing signals that are detectable by a second subset of the plurality of electrodes. The one or more of the first subset of the plurality of electrodes are on a same axis as the second subset of the plurality of electrodes. — 1708

Obtaining, by the processing system, second resulting signals associated with the second sensing signals via the second subset of the plurality of electrodes. — 1710

ADAPTIVE SCANNING USING CAPACITIVE SENSORS

CROSS-REFERENCE TO RELATED APPLICATIONS

This patent application claims the benefit of U.S. Provisional Patent Application No. 63/612,430, filed Dec. 20, 2023, which is incorporated by reference herein in its entirety.

TECHNICAL FIELD

This disclosure relates generally to electronic devices, and more specifically, to improving the performance of capacitive sensors when detecting input objects.

BACKGROUND

Input devices including proximity sensor devices (e.g., touchpads or touch sensor devices) are widely used in a variety of electronic systems. A proximity sensor device typically includes a sensing region, often demarked by a surface, in which the proximity sensor device determines the presence, location, and/or motion of one or more input objects (e.g., a user's finger). Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular or mobile phones).

Proximity sensor devices are typically used in combination with other supporting components, such as display or input devices found in the electronic or computing system. In some instances, the proximity sensor devices are coupled to these supporting components to provide a desired combined function or to provide a desirable complete device package. Proximity sensor devices utilize one or more electrical techniques to determine the presence, location and/or motion of an input object, such as a capacitive sensing technique. The proximity sensor devices often use an array of sensor electrodes arranged in a sensor pattern to detect the presence, location and/or motion of an input object Traditionally, two-dimensional capacitive sensing required transmitting sensing signals to all electrodes of a first axis (e.g., horizontal axis) and detecting the resulting signals obtained by the electrodes of a second axis (e.g., vertical axis). Images were formed by transmitting multiple patterns for the case of coded driving or one transmitter at a time for raster scanning. However, scanning the entire trans-capacitance image for every frame caused significant delays (e.g., requiring a few milliseconds (ms) to scan an image) as it takes time to scan the entire field, and thus, the maximum rate would be limited, and latency increased. Further, the input object signal may be under sampled and/or the input object may move around, which may cause motion artifacts to inadvertently be detected or signal to be lost.

SUMMARY

This summary is provided to introduce a selection of concepts in a simplified form that are further described below. This summary is not intended to necessarily identify key features or essential features of the present disclosure. The present disclosure may include the following various aspects and embodiments.

In an exemplary embodiment, the present disclosure provides a computing device comprising a first set of electrodes and a second set of electrodes. The processing system of the computing device drives one or more of the first set of electrodes to generate first sensing signals that are detected by the second set of electrodes. The first electrodes are bar electrodes that are positioned across a first axis (e.g., horizontal axis) and the second electrodes are bar electrodes that are positioned across on a second axis (e.g., vertical axis) that is different from the first axis. The processing system obtains first resulting signals associated with the first sensing signals via the second set of electrodes. The processing system further determines a first subset of the second set of electrodes that detected an input object on a display device. The processing system also drives the first subset of the second set of electrodes that detected the input object to generate second sensing signals that are detectable by the first set of electrodes. The processing system additional obtains second resulting signals associated with the second sensing signals via the first set of electrodes.

In another exemplary embodiment, the present disclosure provides an input device for performing a scanning process using adaptive scanning. The input device comprises a first set of electrodes that are bar electrodes that are positioned across a first axis; a second set of electrodes that are bar electrodes that are positioned across a second axis that is different from the first axis; and a processing system. The processing system is configured to: drive one or more of the first set of electrodes to generate first sensing signals that are detectable by the second set of electrodes; obtain first resulting signals associated with the first sensing signals via the second set of electrodes; determine, based on the first resulting signals, a first subset of the second set of electrodes that detected an input object; drive one or more of the first subset of the second set of electrodes that detected the input object to generate second sensing signals that are detectable by the first set of electrodes; and obtain second resulting signals associated with the second sensing signals via the first set of electrodes.

In yet another exemplary embodiment, a non-transitory computer-readable medium having processor-executable instructions stored thereon is provided. The processor-executable instructions, when executed, facilitating performance of the following: driving one or more of a first set of electrodes to generate first sensing signals that are detectable by a second set of electrodes, wherein the first set of electrodes are bar electrodes that are positioned across a first axis and the second set of electrodes are bar electrodes that are positioned across a second axis that is different from the first axis; obtaining first resulting signals associated with the first sensing signals via the second set of electrodes; determining, based on the first resulting signals, a first subset of the second set of electrodes that detected an input object; driving one or more of the first subset of the second set of electrodes that detected the input object to generate second sensing signals that are detectable by the first set of electrodes; and obtaining second resulting signals associated with the second sensing signals via the first set of electrodes.

Further features and aspects are described in additional detail below with reference to the FIGs.

BRIEF DESCRIPTION OF THE DRAWINGS

FIGS. 3A-3D depicts exemplary computing devices with transmitter electrodes and receiver electrodes according to one or more examples of the present application.

FIG. 4 is a flowchart of an exemplary process for performing a scanning process using adaptive scanning according to one or more examples of the present application.

FIGS. 5-12 depict illustrations for performing the scanning process using adaptive scanning according to one or more examples of the present application.

FIG. 13 is a flowchart of an exemplary process for performing a scanning process using a modulation reference according to one or more examples of the present application.

FIGS. 14A-14C depict illustrations for performing the scanning process using the modulation reference according to one or more examples of the present application.

FIG. 17 is another flowchart of an exemplary process for performing a scanning process using adaptive scanning according to one or more examples of the present application.

DETAILED DESCRIPTION

The following detailed description is exemplary in nature and is not intended to limit the disclosure or the application and uses of the disclosure. Furthermore, there is no intention to be bound by any expressed or implied theory presented in the preceding background, summary and brief description of the drawings, or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Exemplary devices and methods discussed herein provide for performing a scanning process using adaptive scanning. For instance, the computing device may be operating in an idle state when detecting an input object such as a user's finger. The computing device may transition to an active mode. For example, during the idle state, the computing device may perform spatial resolution scans. During the active scan, the computing device may perform an adaptive scan. For instance, the computing device might not drive all of the electrodes of a particular axis, but instead drive the electrodes that previously received resulting signals indicating an input object. In other words, initially, a first set of electrodes on a first axis may provide sensing signals, and the second set of electrodes on a second axis may obtain resulting signals associated with the sensing signals. Not every set of electrodes on the second axis may obtain resulting signals indicating the detection of the input object. As such, in the next iteration (e.g., next frame), the computing device may drive a subset of the second set of electrodes that detected the input object, and the first set of electrodes may obtain a resulting signal. This may repeat one or more iterations. For instance, for the next iteration, the computing device may drive a subset of the first set of electrodes that detected the input object and the second set of electrodes may obtain a resulting signal, and so on. This will be explained in further detail below.

Figure 1:
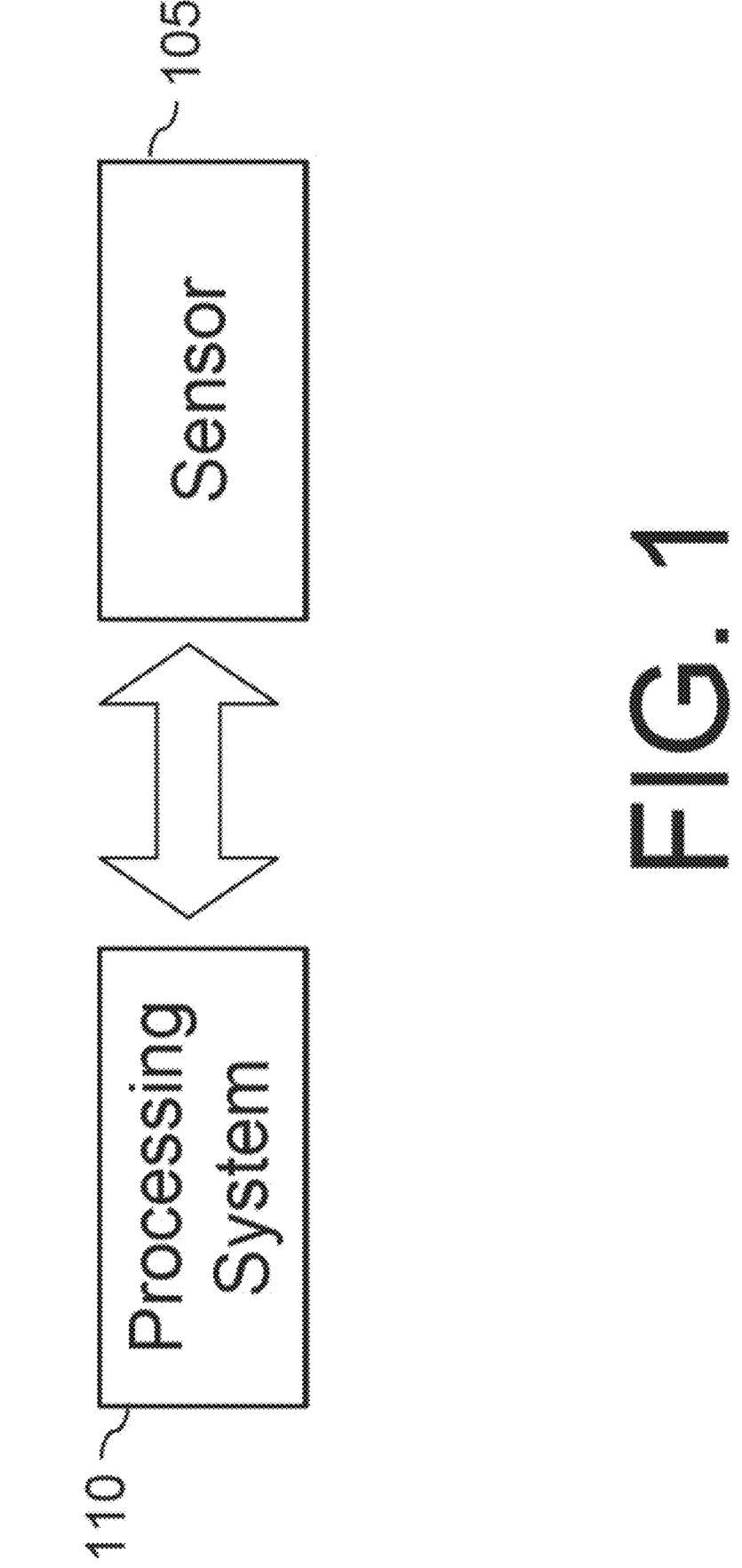
FIG. 1 is a block diagram depicting an input device according to one or more examples of the present application.

FIG. 1 is a block diagram depicting an input device according to one or more examples of the present application. The input device 100 (e.g., computing device) may be configured to provide input to an electronic system. As used herein, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), and wearable computers (such as smart watches and activity tracker devices). Additional examples of electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system may be a host or a slave to the input device.

The input device 100 may be implemented as a physical part of the electronic system, or can be physically separate from the electronic system. As appropriate, the input device 100 may communicate with parts of the electronic system using any one or more of the following: buses, networks, and other wired or wireless interconnections. Examples include Inter-Integrated Circuit (I2C), Serial Peripheral Interface (SPI), Personal System/2 (PS/2), Universal Serial Bus (USB), Bluetooth, radio frequency (RF), and Infrared Data Association (IRDA).

In FIG. 1, a sensor 105 is included with the input device 100. The sensor 105 comprises one or more sensing elements configured to sense input provided by one or more input objects in a sensing region. Examples of input objects include fingers, styli, and hands. The sensing region encompasses any space above, around, in and/or near the sensor 105 in which the input device 100 is able to detect user input (e.g., user input provided by one or more input objects). The sizes, shapes, and locations of particular sensing regions may vary from embodiment to embodiment. In some embodiments, the sensing region extends from a surface of the input device 100 in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

The input device 100 comprises one or more sensing elements for detecting user input. Some implementations utilize arrays or other regular or irregular patterns of sensing elements to detect the input object. The input device 100 may utilize different combinations of sensor components and sensing technologies to detect user input in the sensing region.

The input device 100 is a capacitance (e.g., transcapacitive) input device, wherein voltage or current is applied to create an electric field. Nearby input objects cause changes in the electric field, and produce detectable changes in capacitive coupling that may be detected as changes in voltage, current, or the like.

The input device utilizes arrays or other regular or irregular patterns of capacitive sensing elements to create electric fields. In some instances, separate sensing elements may be ohmically shorted together to form larger sensor electrodes. Some other instances may utilize resistive sheets, which may be uniformly resistive.

The input device may utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "drive electrodes") and one or more receiver sensor electrodes (also "receiver electrodes" or "pickup electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may be, for example, a substantially constant voltage or system ground. In some embodiments, transmitter sensor electrodes and receiver sensor electrodes may both be modulated. The transmitter electrodes are modulated relative to the receiver electrodes to transmit transmitter signals (e.g., sensing signals) and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

Some implementations of the input device 100 are configured to provide images that span one, two, three, or higher dimensional spaces. The input device 100 may have a sensor resolution that varies from embodiment to embodiment depending on factors such as the particular sensing technology involved and/or the scale of information of interest. In some embodiments, the sensor resolution is determined by the physical arrangement of an array of sensing elements, where smaller sensing elements and/or a smaller pitch can be used to define a higher sensor resolution.

In FIG. 1, a processing system 110 is included with the input device 100. The processing system 110 comprises parts of or all of one or more integrated circuits (ICs) and/or other circuitry components. The processing system 110 is coupled to the sensor 105, and is configured to detect input in the sensing region using sensing hardware of the sensor 105.

The processing system 110 may include driver circuitry configured to drive sensing signals with sensing hardware of the input device 100 and/or receiver circuitry configured to receive resulting signals with the sensing hardware. For example, a processing system may be configured to drive transmitter signals onto transmitter sensor electrodes of the sensor 105, and/or receive resulting signals detected via receiver sensor electrodes of the sensor 105.

The processing system 110 may include a non-transitory computer-readable medium having processor-executable instructions (such as firmware code, software code, and/or the like) stored thereon. The processing system 110 can be implemented as a physical part of the sensor 105, or can be physically separate from the sensor 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the sensor 105 of the input device 100 to produce electrical signals indicative of input (or lack of input) in a sensing region. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

The sensing region of the input device 100 may overlap part or all of an active area of a display device, for example, if the sensor 105 provides a touch screen interface. The display device may be any suitable type of dynamic display capable of displaying a visual interface to a user, including an inorganic light-emitting diode (LED) display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for thin-film transistor (TFT) circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device.

Figure 2:
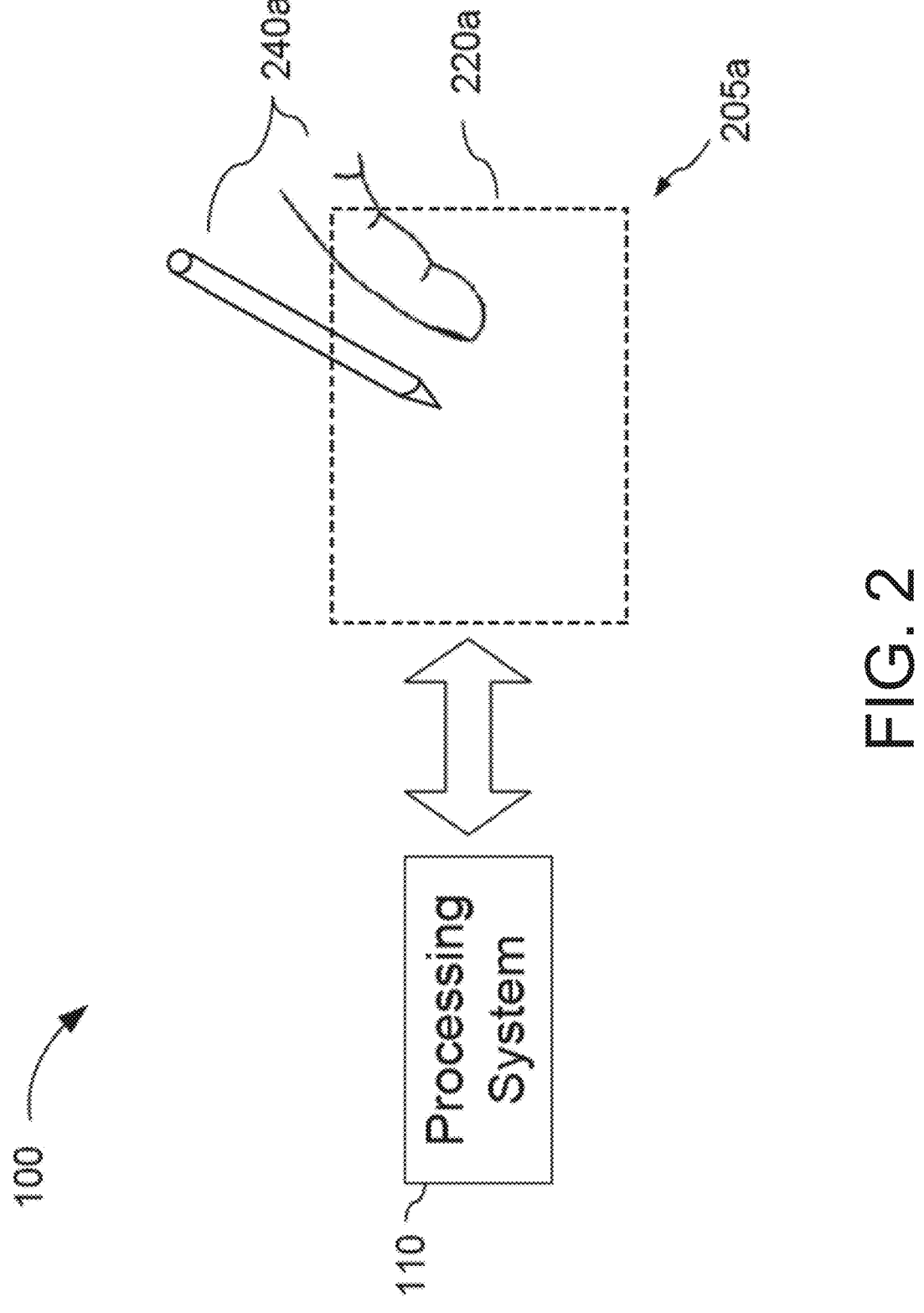
FIG. 2 is a block diagram depicting a further exemplary input device according to one or more examples of the present application.

FIG. 2 is a block diagram depicting a further exemplary input device. For instance, the input device 100 is shown as including a touch sensor 205a. The touch sensor 205a is configured to detect position information of an input object 240a within the sensing region 220a. The input object 240a may include a finger or a stylus, as shown in FIG. 2. The sensing region 220a may include an input surface having a larger area than the input object. The touch sensor 205a may include an array of sensing elements with a resolution configured to detect a location of a touch to the input surface.

Figure 3A:
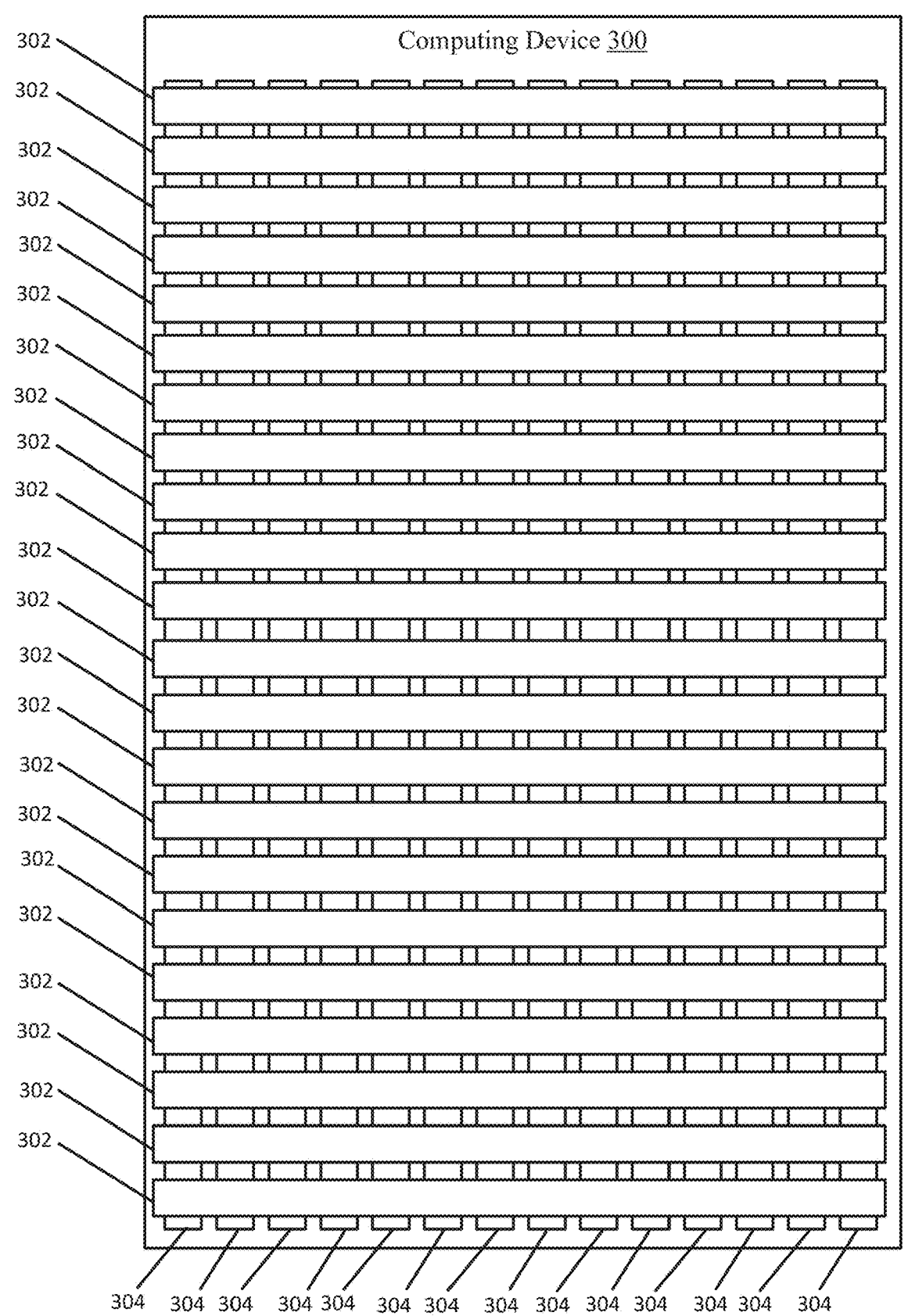

FIGS. 3A-3D depict exemplary computing devices with transmitter electrodes and receiver electrodes according to one or more examples of the present application. Referring to FIG. 3A, a computing device 300 (e.g., an input device such as a mobile phone or tablet) that includes an exemplary orthogonal grid of electrodes 302 and 304 is shown. For instance, the computing device 300 includes vertical electrodes 304 and horizontal electrodes 302. The electrodes 302 and 304 may be transmitter electrodes and/or receiver electrodes. For instance, initially, the processing system 110 may drive the horizontal electrodes 302 to generate sensing or transmitter signals. The processing system 110 may obtain the resulting signals from the vertical electrodes 304. Then, in the next iteration (e.g., next frame), the processing system 110 may drive one or more of the vertical electrodes 304 to generate sensing or transmitter, and obtain the resulting signals from the horizontal electrodes 302. The processing system 110 may repeat this process one or more iterations. Additionally, and/or alternatively, the processing system 110 might not drive all of the horizontal electrodes 302 and/or the vertical electrodes 304. For example, during the scanning process, the processing system 110 may drive a subset of the horizontal electrodes 302 and/or the vertical electrodes 304 based on those electrodes 302 and/or 304 detecting an input object (e.g., a user's finger) in the previous iteration. This will be described in further detail below.

It will be appreciated that the electrodes shown in FIG. 3A are shown for illustrative purposes, but that exemplary implementations of the electrodes of the computing device 300 may be of any size—including, for example, 16×16 (e.g., 16 rows of electrodes and 16 columns of electrodes), 56×96, 80×80, 88×116, 56×144, 72×80, etc. It will further be appreciated that although a grid with transmitter electrodes and receiver electrodes orthogonal to one another in a bars and stripes configuration is used herein as an example, other exemplary implementations of a foldable device may utilize other configurations of transmitter electrodes and receiver electrodes.

Figure 3B:
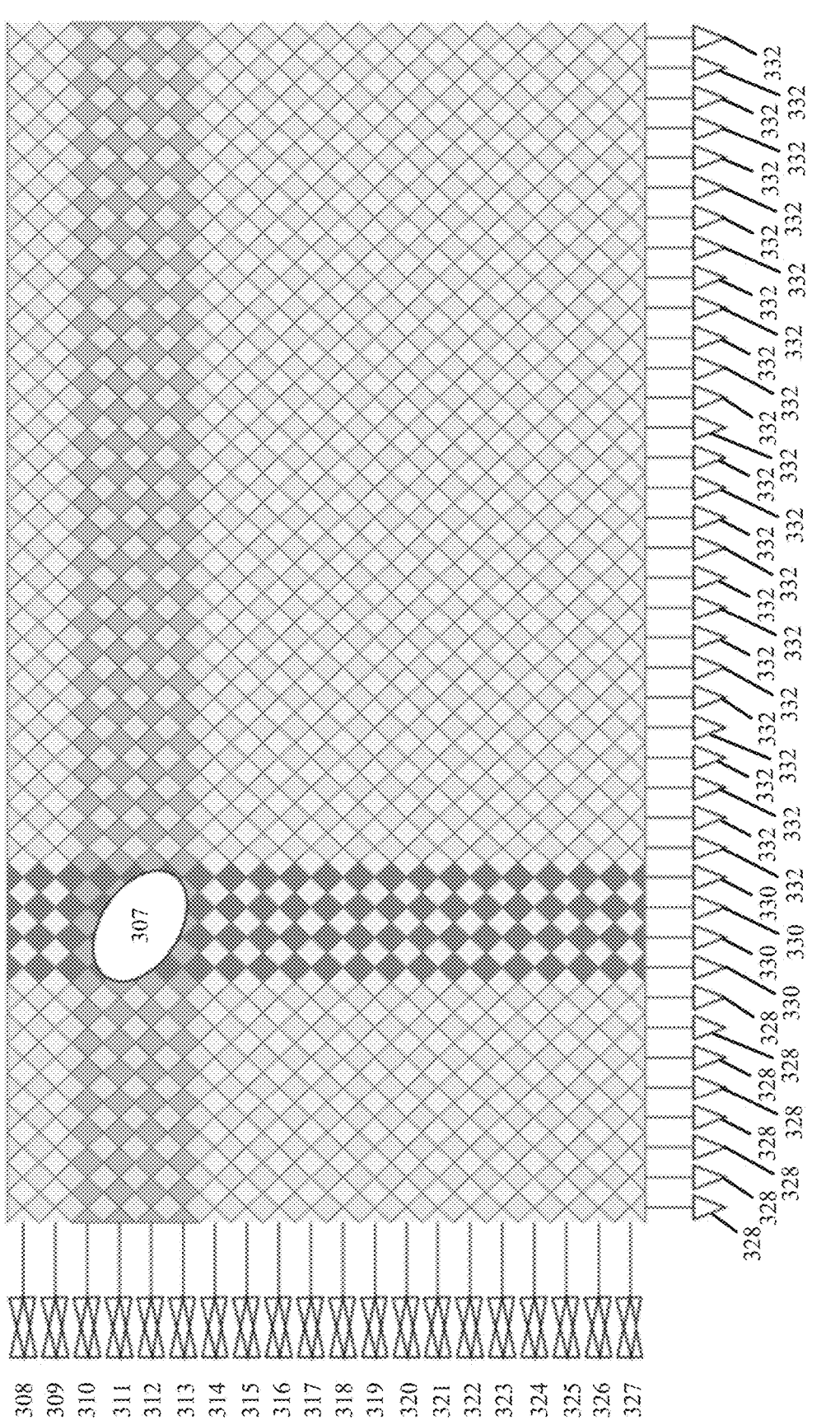

FIG. 3B depicts a computing device 306 with a plurality of vertical and horizontal electrodes. For example, electrodes 308-327 may be the horizontal electrodes (e.g., similar to the horizontal electrodes 302 of FIG. 3A). Electrodes 328-332 may be sets of the vertical electrodes (e.g., similar to the vertical electrodes 304 of FIG. 3A). For instance, electrodes 328 may be a first set of vertical electrodes, electrodes 330 may be a second set of vertical electrodes, and electrodes 332 may be a third set of vertical electrodes. The processing system 110 may drive the transmitter electrodes 308-327 using high and low resolution signals (e.g., denoted as the vector $\vec{T}_y$). For example, electrodes 310-313 may be driven using high resolution signals given that these electrodes previously detected the user's finger. The rest of the transmitter electrodes (e.g., electrodes 308, 309, and 314-327) may be driven using low resolution signals (e.g., not driven at all or driven using positive/negative signals). The vertical electrodes may be used to obtain the resulting signals associated with the sensing signals from the transmitter electrodes (e.g., denoted as the vector $\vec{R}_x$). For example, FIG. 3B illustrates the second set of vertical electrodes 330 receiving a signal based on the user's finger 307.

Figure 3C:
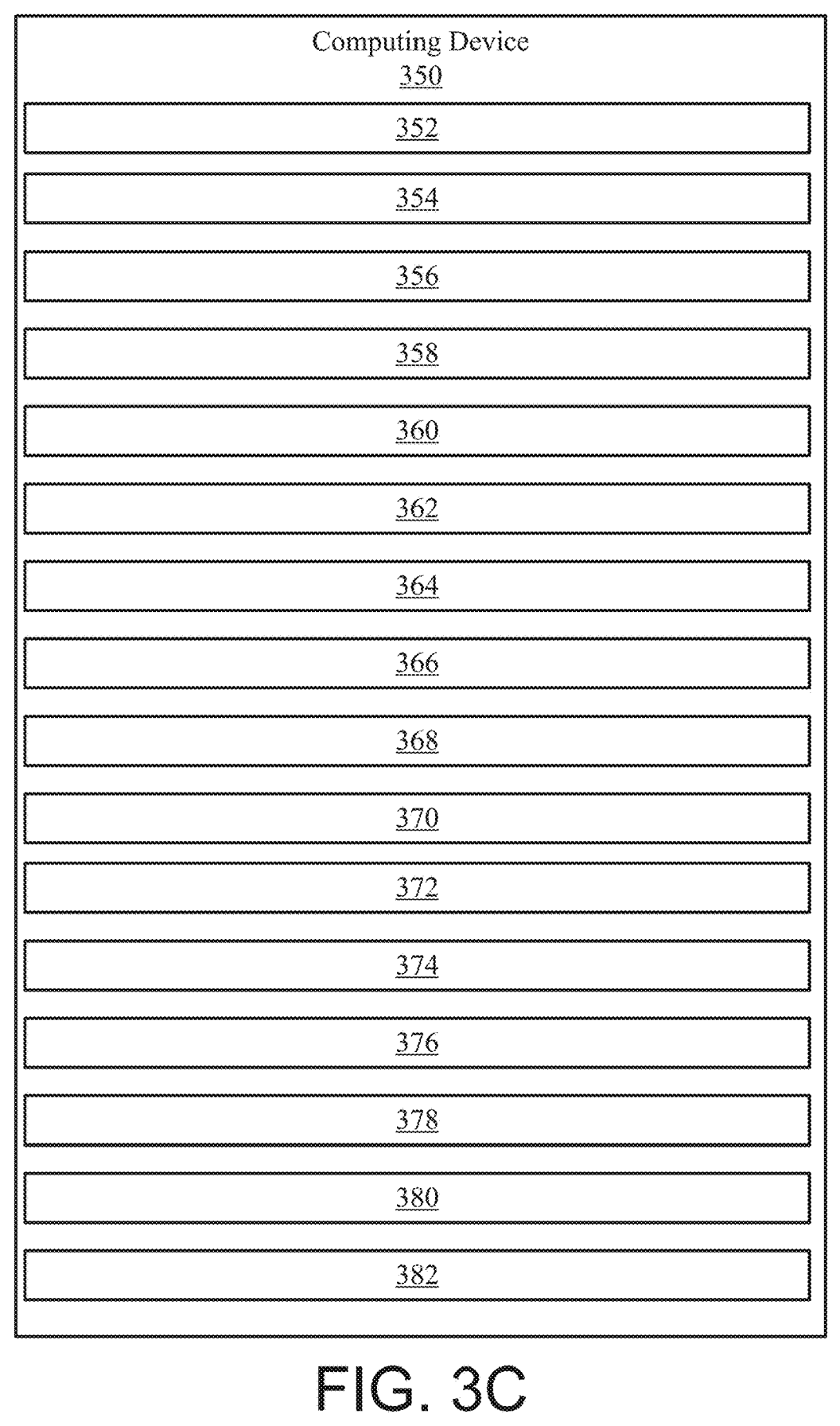
Figure 3D:
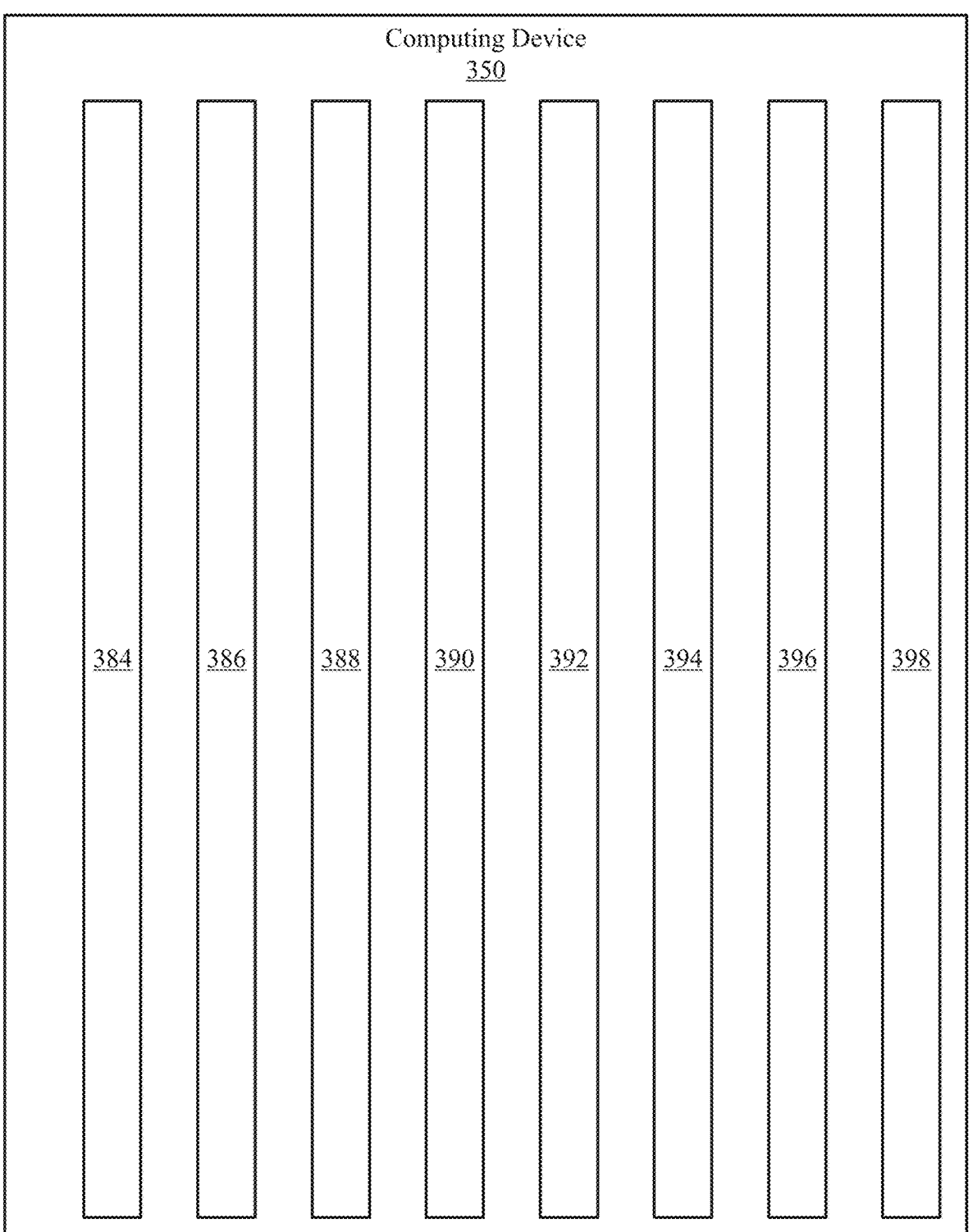

FIGS. 3C and 3D show another computing device 350. For example, FIG. 3C shows the horizontal electrodes 352-382 of the computing device 350 and FIG. 3D shows the vertical electrodes 384-398 of the computing device 350.

It will be appreciated that the exemplary computing devices depicted in FIGS. 3A to 3D are merely examples, and that the principles discussed herein may also be applicable to other computing devices with additional and/or alternative arrangements of electrodes. For instance, the receiver and transmitter electrodes may be located different from the arrangement shown in FIGS. 3A-3D. In addition, the number of vertical and horizontal electrodes may be different from the number of vertical and horizontal electrodes shown in FIGS. 3A-3D.

FIG. 4 is a flowchart of an exemplary process for performing a scanning process using adaptive scanning according to one or more examples of the present application. The process 400 may be performed by the input device 100 and in particular, the processing system 110 shown in FIG. 1. However, it will be recognized that an input device that includes additional and/or fewer components as shown in FIG. 1 may be used to perform process 400, that any of the following blocks may be performed in any suitable order, and that the process 400 may be performed in any suitable environment. The descriptions, illustrations, and processes of FIG. 4 are merely exemplary and the process 400 may use other descriptions, illustrations, and processes for performing a scanning process using adaptive scanning.

In operation, at block 402, the processing system 110 of an input device 100 (e.g., a computing device) drives one or more of a first set of electrodes to generate first sensing signals that are detectable by a second set of electrodes. In an embodiment, the first set of electrodes are bar electrodes that are positioned across a first axis and the second set of electrodes are bar electrodes that are positioned across a second axis that is different from the first axis. For instance, referring to FIGS. 3C and 3D, the input device 100 may be and/or include the computing device 350, which includes the vertical and horizontal electrodes 352-398. The horizontal electrodes 352-382 are positioned across a first axis (e.g., a horizontal axis) and the vertical electrodes 384-398 are positioned across a second axis (e.g., vertical axis). The horizontal electrodes 352-382 span the vertical direction and the vertical electrodes 384-398 span the horizontal direction. The processing system 110 may drive the first set of electrodes (e.g., the horizontal electrodes 352-382) to generate first sensing signals that are detectable by a second set of electrodes (e.g., the vertical electrodes 384-398). The set of stimuli driven on the first set of electrodes is denoted as the vector $\vec{T}_y$ and the signals received on the second set of electrodes is denoted as the vector $\vec{R}_x$. The processing system 110 may swap the order and drive the second set of electrodes (e.g., the vertical electrodes 384-398) to generate sensing signals that are detectable by the first set of electrodes (e.g., horizontal electrodes 352-382). The ensuing axis alternation is denoted by the vectors $\vec{T}_x$ and $\vec{R}_y$.

At block 404, the processing system 110 obtains first resulting signals associated with the first sensing signals via the second set of electrodes. For example, based on driving the first set of electrodes that are positioned across the first axis (e.g., the horizontal electrodes 352-382), the processing system 110 obtains resulting signals using the second set of electrodes (e.g., the vertical electrodes 384-398). The resulting signals may indicate whether an input object has been detected by the second set of electrodes. For instance, based on the processing system 110 comparing the current resulting signals (e.g., the value or vector $\vec{R}_x$ and/or $\vec{R}_y$) with historical and/or baseline measurements, the processing system 110 may determine whether an input object has been detected. For example, as mentioned above, if an input object is positioned on or near one or more of the second set of electrodes, the electrical characteristic (e.g., voltage or current) obtained by an electrode from the second set of electrodes may change. If a user's finger is positioned across the electrodes 388-392 of FIG. 3D, the electrodes 388-392 may provide a changed electrical characteristic to the processing system 110 when compared to the electrodes 384-386 and 394-398.

At block 406, the processing system 110 determines a first subset of the second set of electrodes that detected an input object (e.g., input object 240a) on a display device. For example, based on the changed electrical characteristic that is obtained by certain electrodes from the second set of electrodes (e.g., the electrodes 388-392 that had their electrical characteristic changed due to the user's finger), the processing system 110 may determine that these electrodes detected an input object. The processing system 110 may categorize, identify, or group these electrodes into the first subset of electrodes.

At block 408, the processing system 110 drives one or more of the first subset of the second set of electrodes that detected the input object to generate second sensing signals that are detectable by the first set of electrodes. For example, instead of driving all of the second set of electrodes, the processing system 110 may drive one or more of the first subset of electrodes that detected the input object (e.g., the electrodes 388-392). In some examples, the processing system 110 may drive all of the first subset of electrodes that detected the input object (e.g., the electrodes 388-392). In other examples, the processing system 110 might not drive all of the first subset of electrodes that detected the input object, and may instead drive one or two of the first subset of electrodes. For instance, based on electrodes 388-392 detecting the input object, during each scan phase, the processing system 110 may drive two electrodes. For example, during the first scan phase, the processing system 110 may drive the electrodes 388 and 390, and detect resulting signals from the horizontal electrodes 352-382. Then, during a second scan phase, the processing system 110 may drive the electrodes 390 and 392, and detect resulting signals from the horizontal electrodes 352-382. Following, during a third scan phase, the processing system 110 may drive the electrode 392 and another electrode that did not detect the input object such as electrode 394 or electrode 384. This will be explained in further detail below.

At block 410, the processing system 110 obtains second resulting signals associated with the second sensing signals via the first set of electrodes. For instance, the processing system 110 may obtain second resulting signals based on driving one or more of the first subset of electrodes (e.g., the electrodes 388-392). Using the second resulting signals and the first resulting signals, the processing system 110 may determine a position of the input object (e.g., a location of the input object such as the user's finger on the display screen or touchscreen).

The process 400 may repeat one or more times. For example, subsequent to block 410, the processing system 110 may determine a second subset of the first set of electrodes. For instance, the user's finger may be detected by only a certain number of electrodes from the first set (e.g., electrodes 360-364). Then, the processing system 110 may drive one or more of the second subset of electrodes (e.g., electrodes 360-364), and obtain resulting signals from the second set of electrodes. This process may continue based on the detection of the user's finger.

In other words, by using process 400, after a first instance (e.g., after a spatial resolution or idle mode), the processing system 110 might not drive the entire set of vertical/horizontal electrodes 352-398, and instead drive only the electrodes that detected an input object (e.g., user's finger). Then, the processing system 110 may switch orientations or alternate axes of driving the electrodes of the input device 100 (e.g., a subset of the first/second set of electrodes), and obtaining the resulting signals from the driven electrodes. This will be described in further detail below.

Figure 5:
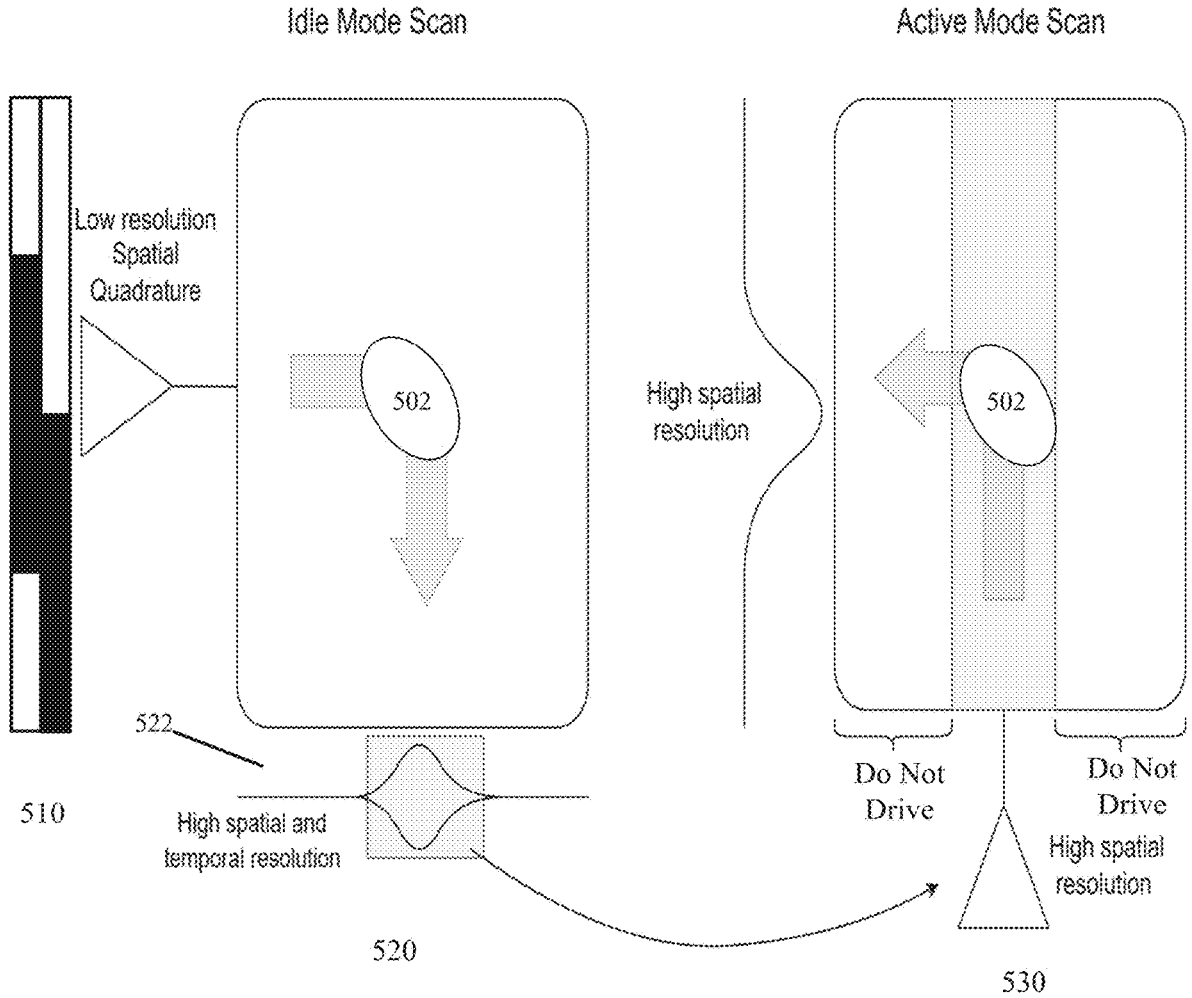
Figure 6:
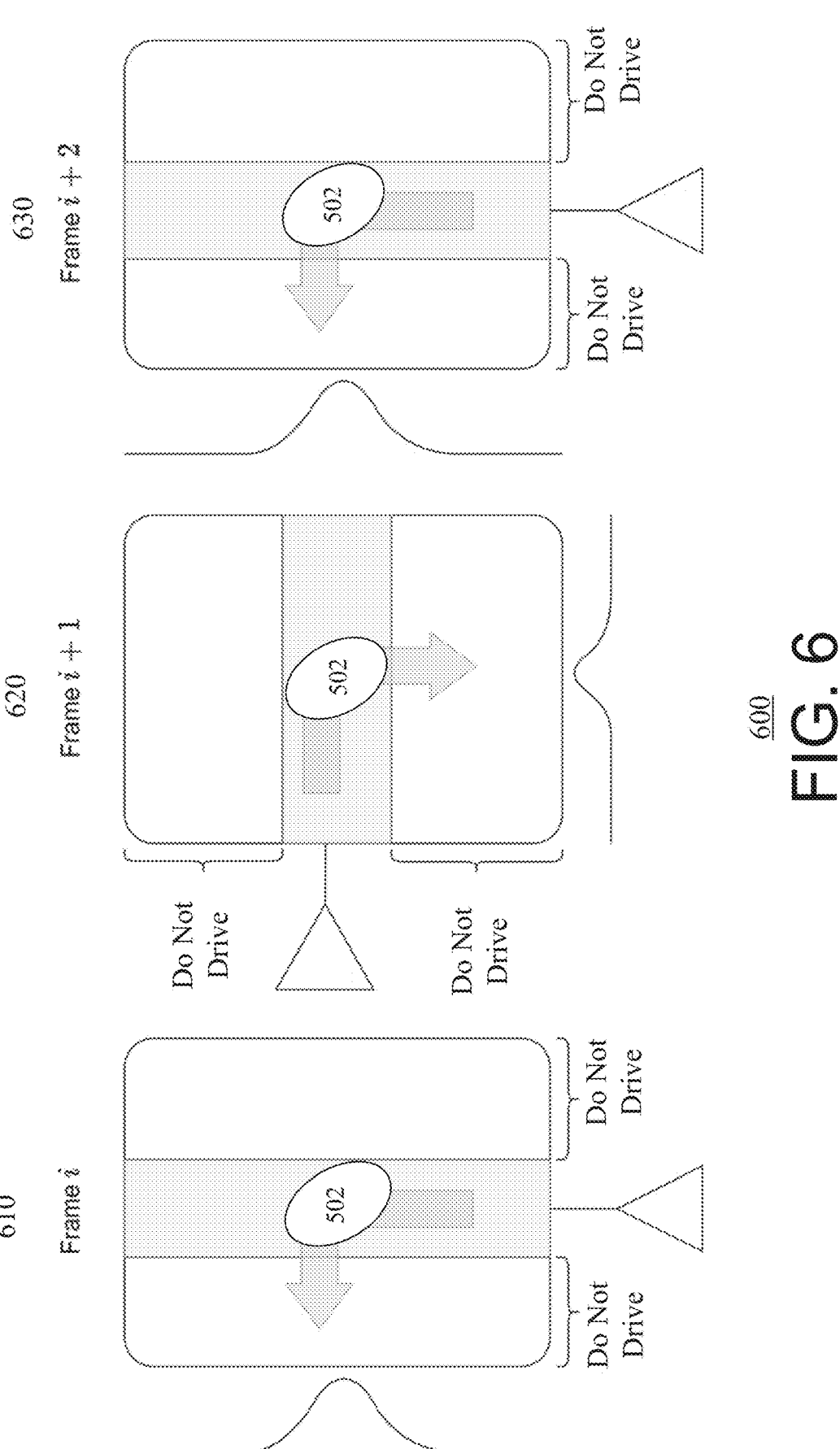

FIGS. 5-12 depict illustrations for performing the scanning process using adaptive scanning according to one or more examples of the present application. For example, FIGS. 5 and 6 provide further details regarding process 400. For instance, initially, at step 510, the processing system 110 may perform a spatial scan by driving a first set of electrodes. As shown, the first set of electrodes are the horizontal electrodes (e.g., the electrodes 352-382 of FIG. 3C), but in other examples, the first set of electrodes may be the vertical electrodes (e.g., the electrodes 384-398 of FIG. 3D). For instance, the processing system 110 may split the first set of electrodes into multiple groups. As shown at step 510, the processing system 110 groups the first set of electrodes into four groups (e.g., a first group such as electrodes 352-358, a second group such as electrodes 360-366, a third group such as electrodes 368-374, and a fourth group such as electrodes 376-382). The processing system 110 may provide different sensing signals (e.g., positive and negative sensing signals) to the different groups of electrodes. For instance, the processing system 110 may provide a first type of sensing signal (e.g., a positive sensing signal associated with a positive electrical characteristic such as a positive voltage) to the first and fourth groups of electrodes (e.g., electrodes 352-358 and 376-382), and a second type of sensing signal (e.g., a negative sensing signal associated with a negative electrical characteristic such as a negative voltage) to the second and third groups of electrodes (e.g., electrodes 360-374). The first and second types of sensing signals are shown at step 510 using the white and shaded regions. Then, the processing system 110 may provide the first and second types of sensing signals to the groups of electrodes again, but switch up which groups are provided the first/second types of sensing signals. For instance, the processing system 110 may provide the first type of sensing signals (e.g., the positive sensing signal) to the first and second group of electrodes and the second type of sensing signals (e.g., the negative sensing signal) to the third and fourth group of electrodes. The above grouping of electrodes and providing the types of sensing signals to the specific groups of electrodes are merely exemplary, and the processing system 110 may group the electrodes into different groups, including different number of groups (e.g., six groups of electrodes) and provide the first/second types of sensing signals to the different groups.

Based on providing the sensing signals, the processing system 110 obtains two profiles of resulting signals from the second set of electrodes (e.g., the vertical electrodes 384-398). For instance, after providing or driving the first set of electrodes (e.g., provide a first type of sensing signal to the first and fourth groups of electrodes and a second type of sensing signal to the second and third groups of electrodes), the processing system 110 may obtain a first profile of resulting signals from the second set of electrodes. Then, after providing or driving the first set of electrodes again, the processing system 110 may obtain a second profile of resulting signals. This is shown in step 520. For example, in step 520, the processing system 110 may obtain a second profile that indicates the signals 522 that were obtained from the vertical electrodes 384-398. For instance, as shown, the vertical electrodes that detected the user's finger 502 (e.g., electrodes 388-394) may have a non-zero magnitude and the other electrodes (e.g., electrodes 384, 386, 396, and 398) may have a substantially zero magnitude. In some instances, the processing system 110 may be subject to noise, and the vertical electrodes may detect the noise. Thus, the other electrodes (e.g., electrodes 384, 386, 396, and 398 that did not detect the user's finger 502) might not detect a substantially zero magnitude, but may instead detect a baseline magnitude that is based on the detected noise. The vertical electrodes that detected the user's finger (e.g., electrodes 388-394) may detect a magnitude that is above and/or below the baseline magnitude.

As mentioned above, the electrical characteristics of certain receive electrodes (e.g., the vertical electrodes 384-398) may change due to an input object such as a user's finger 502. As such, the processing system 110 may analyze the two profiles to determine the location of the user's finger 502 along the x-axis.

Subsequently, at step 530, the processing system 110 may determine the vertical electrodes that detected the input object (e.g., the user's finger 502). For instance, as shown, the processing system 110 may determine that the middle vertical electrodes (e.g., electrodes 388-394) have detected the user's finger 502. Then, the processing system 110 may drive one or more of a subset of the vertical electrodes that detected the user's finger 502, and might not drive the other vertical electrodes (e.g., electrodes 384-386 and 396-398). The processing system 110 may obtain a profile from the horizontal electrodes that detected the user's finger. For instance, similarly, based on driving the subset of vertical electrodes that detected the user's finger 502, the processing system 110 may obtain resulting signals from the horizontal electrodes and generate a profile based on the resulting signals. The processing system 110 may detect the location of the user's finger 502 based on the newly generated profile (e.g., the horizontal electrodes that detected the user's finger 502). As such, by using step 530, the processing system 110 is able to detect the location of the user's finger 502 on the display device/sensing region (e.g., sensing region 205a). For instance, the processing system 110 is able to detect the location of the user's finger 502 on the x-axis based on analyzing the two profiles from the idle mode scan (e.g., step 520), and able to detect the location of the user's finger 502 on the y-axis based on analyzing the profile from the first active mode scan (e.g., step 530). The processing system 110 may continuously drive subsets of the first/second set of electrodes, including alternating which set of electrodes are driven, to update the location of the user's finger 502 in the x-axis and the y-axis.

In some variations, the processing system 110 may use a code division multiplexing (CDM) coding scheme to drive the subsets of the first/second set of electrodes. For instance, as mentioned previously, the processing system 110 may provide different types of sensing signals to electrodes. Using the CDM coding scheme, the processing system 110 may provide the different types of sensing signals to the subset of identified electrodes. For instance, referring to step 520, the processing system 110 may identify a subset of electrodes that detected the user's finger 502 (e.g., electrodes 388-394). At step 530, the processing system 110 may use a CDM coding scheme for the subset of electrodes. The CDM coding scheme may provide a first type of sensing signal (e.g., positive signal) to one or more of the electrodes from the subset, and a second type of sensing signal (e.g., negative signal) to the other electrodes from the subset. The set of sensing signals may be collected into a vector where the type of sensing signals forms a code (e.g., the processing system 110 may obtain a vector indicating the set of sensing signals, and the type of sensing signals may form a code). The CDM coding scheme may continue to do this for each of the different electrodes. Each set of sensing signals may be collected into separate vectors and, depending on the type of signals, form new codes. For instance, the processing system 110 may provide the first type of sensing signal to a first electrode of the subset (e.g., electrode 388) and the second type of sensing signal to the others (e.g., electrodes 390-394), and the collection of sensing signals may be denoted as $\vec{T}_0$. The processing system 110 may then provide the first type of sensing signal to a second electrode of the subset (e.g., electrode 390) and the second type of sensing signal to the others (e.g., electrode 388, 392, and 394), and this collection of sensing signals may be denoted as $\vec{T}_1$. The processing system 110 may perform this to the other electrodes within the subset and denote their respective collections as $\vec{T}_2$, $\vec{T}_3$ and so on. As such, the processing system 110 may obtain four profiles from the first set of electrodes (e.g., electrodes 352-382) based on the four scans using the CDM coding scheme. The four scans are merely exemplary, and the processing system 110 may perform the CDM coding scheme to obtain multiple different scans and profiles. For example, based on the processing system 110 determining that the subset of electrodes that detected the user's finger include five or six electrodes, the processing system 110 may provide the CDM coding scheme to obtain five or six profiles based on the five or six different scans of positive/negative sensing signals. In some instances, the CDM coding scheme may use a matrix indicating to provide the first type of signal to only one electrode and provide the second type of signal to the other electrodes at each scan/burst. In other instances, the CDM coding scheme may use a different matrix in which there are more than two values (e.g., +1, 0, −1) that are provided to drive the electrodes at each scan/burst.

In some examples, the processing system 110 may use a second order CDM coding scheme that does not drive all of the electrodes that detected the user's finger 502 in each scan. For instance, in the example described above where the electrodes 388-394 detected the user's finger 502, the processing system 110 may have used a fourth order CDM coding scheme, which drove all four of the electrodes 388-394 that detected the user's finger 502 during each of the four scans. In contrast, in other examples, the processing system 110 may use a second order CDM coding scheme that drives only two electrodes during each scan regardless of how many electrodes detected the user's finger 502. For instance, if the electrodes 388-394 detected the user's finger 502 (e.g., the electrodes 388-394 are the first subset of the second set of electrodes from block 406 of FIG. 4), during the first scan, the processing system 110 may provide sensing signals to only two of the electrodes from the four electrodes 388-394 that detected the user's finger 502. For instance, during the first scan, the processing system 110 may provide a first type of sensing signal (e.g., positive signal) to a first electrode (e.g., electrode 388) and a second type of sensing signal (e.g., negative signal) to a second electrode (e.g., electrode 390). Then, during the second scan, the processing system 110 may provide the first type of sensing signal (e.g., positive signal) to another electrode (e.g., the electrode 390) and the second type of sensing signal (e.g., negative signal) to yet another electrode (e.g., the electrode 392). This may continue for the third scan as well. For instance, for the third scan, the processing system 110 may provide the first type of sensing signal to electrode 392 and the second type of sensing signal to electrode 394. Following, in the fourth scan, the processing system 110 may provide the first type of signal to the remaining electrode 394 and the second type of signal to an electrode (e.g., a reference electrode) that did not detect the user's finger 502 such as the electrode 396 or the electrode 388. Therefore, in the second order CDM coding scheme, in the initial scans (e.g., first through third scans described above), the processing system 110 may alternate providing first and second types of signals to two of the electrodes that detected the input object (e.g., the user's finger 502). Then, in the final scan (e.g., the fourth scan), the processing system 110 may provide the first type of signal to the final electrode that detected the input object and a reference electrode that did not detect the input object (e.g., the reference electrode may be any of electrodes 384, 386, 396, or 398).

FIG. 6 describes step 530 and the subsequent steps of FIG. 5 in more detail. For example, at step 610, the processing system 110 performs step 530 of FIG. 5 at frame i (e.g., an initial frame). For instance, the processing system 110 drives one or more of the subset of vertical electrodes and does not drive the other vertical electrodes. The processing system 110 obtains one or more profiles from the horizontal electrodes based on this. At step 620, at a second frame i+1, the processing system 110 determines and drives one or more of a subset of horizontal electrodes that detected the user's finger 502 (e.g., based on a second or a fourth order CDM coding scheme described above), and does not drive the other horizontal electrodes. The processing system 110 obtains one or more profiles from the vertical electrodes based on this. At step 630, at a third frame i+2, the processing system 110 determines and drives another subset of vertical electrodes, and does not drive the other vertical electrodes. The processing system 110 obtains one or more profiles from the horizontal electrodes based on this. This may repeat. As such, in the example shown in FIG. 6, for the even frames, the processing system 110 may drive the electrodes on the short axis (e.g., the vertical electrodes). On the odd frames, the processing system 110 may drive the electrodes on the long axis (e.g., the horizontal electrodes). By the processing system 110 performing this adaptive scanning process (e.g., axis alternation), the processing system 110 is able to rapidly track the input object (e.g., the user's finger 502).

In some examples, the processing system 110 may utilize scans, signals, and profiles from previous frames to determine which electrodes to drive in the subsequent frames. For instance, referring to step 520 and FIG. 5, the processing system 110 may determine and obtain a profile of resulting signals from the vertical electrodes 384-398 (e.g., a profile indicating the signals 522 shown in FIG. 5). For instance, this profile may indicate that the electrodes 388-394 detected the user's finger 502. Then, at steps 610 and 620, the processing system 110 may proceed as described above. For instance, at step 620, after driving the subset of horizontal electrodes that detected the user's finger 502, the processing system 110 may determine and obtain a second profile of resulting signals from the vertical electrodes 384-398, and the second profile may indicate electrodes that detected the user's finger 502. At step 630, instead of driving all of the vertical electrodes that detected the user's finger 502, the processing system 110 may compare the initial profile from step 520 with the second profile from step 620. Based on the comparison, the processing system 110 may drive one or more of the vertical electrodes based on movement of the user's finger 502. For example, the initial profile from step 520 may indicate that the electrodes 388-394 detected the user's finger 502. Subsequently, the user's finger 502 may move, and at step 620, the second profile may indicate that electrodes 390-396 now detected the user's finger 502. As such, the signals indicated by the second profile may shift to the right from the signals 522 from step 520 as now electrode 388 is not detecting the user's finger 502 and electrode 396 is detecting the user's finger 502 due to the movement of the user's finger 502.

At step 630, instead of driving the electrodes 390-396 that detected the user's finger 502, the processing system 110 may compare the signals from the previous profile (e.g., from step 520) and the current profile (e.g., from step 620). For example, the processing system 110 may subtract the signals from the previous profile and the current profile to obtain delta signals. Following, using one or more thresholds and/or filters (e.g., high-pass filters), the processing system 110 may determine the electrodes that detected differences between the previous and current profiles. For instance, based on using one or more thresholds and/or high-pass filters to process the delta signals, the processing system 110 may identify that the electrodes 388 and 396 indicated a difference between a previous frame (e.g., from step 520) and the current frame (e.g., from step 620). Thus, at step 630, instead of driving all of the vertical electrodes that detected the user's finger 502 (e.g., the vertical electrodes 390-396), the processing system 110 may only drive the electrodes 388 and 396 as well as the reference electrodes. In other words, the processing system 110 might not drive the electrodes 390-394 at step 630. For instance, during a first scan, the processing system 110 may provide a first type of signal to the electrode 388 and a second type of signal to electrode 396. Then, during a second scan, the processing system 110 may provide a first type of signal to the electrode 396 and a second type of signal to a reference electrode (e.g., an electrode that did not detect the user's finger and is not the electrode 388 that was used in during the first scan). For instance, the reference electrode may be electrodes 384, 386, or 398. Alternatively, in another example, two references electrodes may be used. For instance, during a first scan, the processing system 110 may provide a first type of signal to the electrode 388 and a second type of signal to a reference electrode (e.g., electrode 384). Then, during a second scan, the processing system 110 may provide a first type of signal to the electrode 396 and a second type of signal to another reference electrode (e.g., electrode 398).

Subsequently, after driving one or more of the vertical electrodes based on the delta signal, the processing system 110 may obtain a profile for the horizontal electrodes (e.g., horizontal electrodes 352-382). Then, similarly, based on the profile obtained from step 610 and the profile obtained from step 630, the processing system 110 may determine delta signals for the horizontal electrodes. Following, using the delta signals, the processing system 110 may identify the horizontal electrodes that detected the movement of the user's finger 502, and then drive the identified horizontal electrodes that detected the movement of the user's finger 502. Afterwards, the process may repeat.

In some examples, the user's finger 502 may be stationary. As such, the profile obtained at step 620 may be the same or substantially similar to the profile obtained at step 520. Thus, the processing system 110 may determine the delta signals from the two profiles, and the delta signals may indicate no change in electrodes between obtained profiles from steps 520 and 620. In such instances, based on the detection that the user's finger 502 is stationary, the processing system 110 may cease to continue performing the adaptive scanning process (e.g., axis alternation that is described in FIGS. 4, 5, and/or 6), and instead perform a normal processing sequence of sensing using spatial quadrature patterns to detect motion.

In other examples, based on the detection that the user's finger 502 is stationary, the processing system 110 may perform a minimum rate refresh scan that uses a minimum rate of refresh. For instance, the processing system 110 may set the minimum rate of refresh based on user indication and/or a pre-set value. In some variations, the processing system 110 may determine the minimum rate of refresh based on a noise floor. For example, in one or more frames, the processing system 110 might not drive any transmitter electrodes (e.g., the transmitter electrodes 352-385), but may obtain resulting signals from the receiver electrodes (e.g., the receiver electrodes 384-398). Given that the transmitter electrodes were not driven, the resulting signals may indicate the noise floor (e.g., noise signals) that are detected by the receiver electrodes. The processing system 110 may use the noise floor to determine the minimum rate of refresh. For instance, the noise floor may indicate a low frequency noise and/or drift, which may be referred to as a "1/f noise." The predominant source of the low frequency noise and/or drift may be thermal, and the time constant associated with the low frequency noise and/or drift is typically in seconds. The long term drift due to the device aging or sensor degradation may be associated with time constants that extend into days or even years. However, as long as the baseline references are established in the "seconds" time frame, the slow varying disturbances may be compensated. Thus, in some embodiments, the processing system 110 may perform a full refresh on the order of 2.5 seconds.

FIGS. 7-12 show further use cases of the adaptive scanning process (e.g., axis alternation). For example, instead of not driving the other electrodes, the processing system 110 may drive the other electrodes using a first type or a second type of signal for each of the scans of the CDM coding scheme. By doing this, the processing system 110 may determine additional input objects (e.g., one or more additional user fingers) that are on the display device/sensing region.

Figure 7:
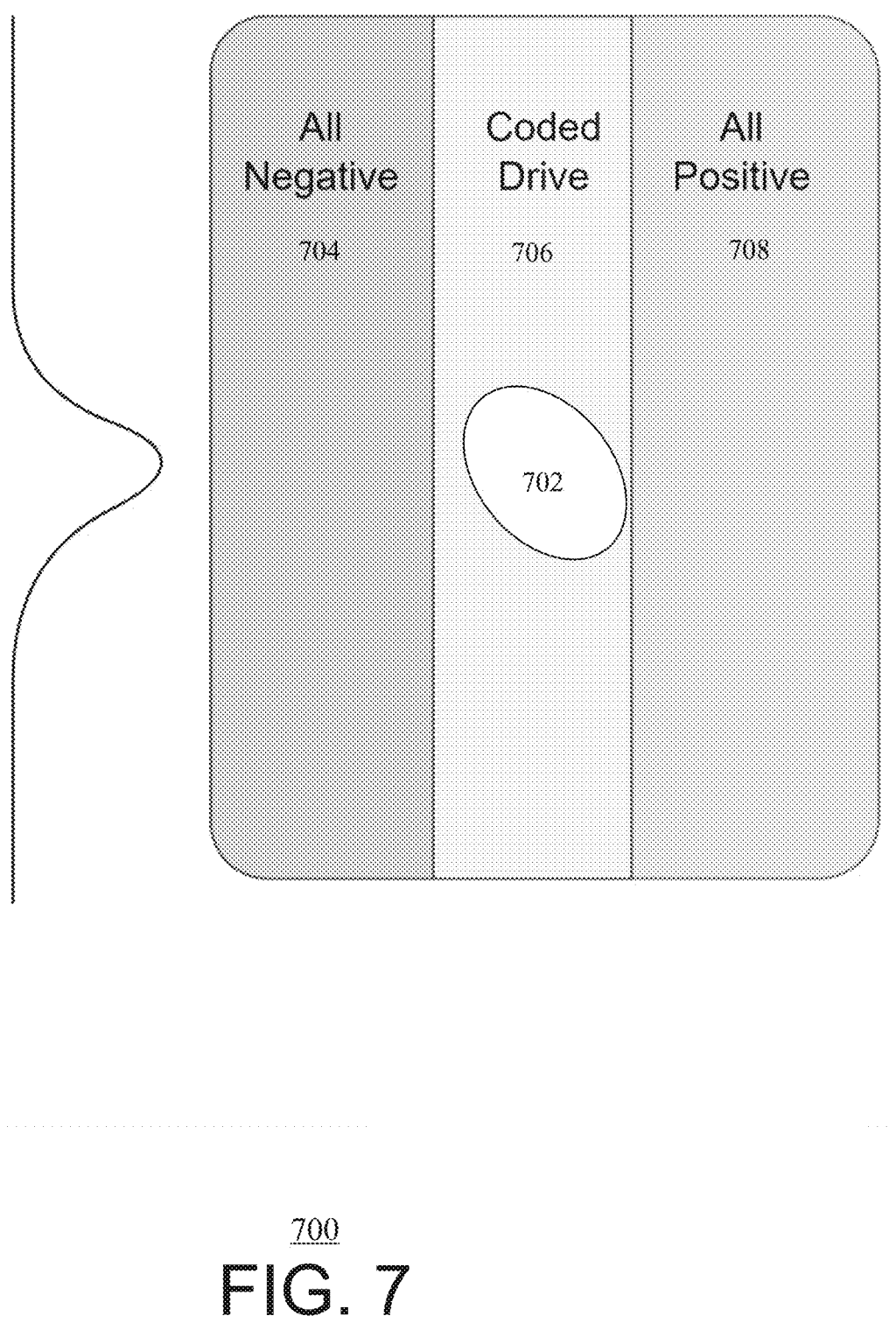

For example, referring to FIG. 7, the processing system 110 may use the driving scheme shown in illustration 700. For instance, the processing system 110 may split the vertical electrodes into three groups—the first subset described above that detected the user's finger 702 (shown in region 706), a second subset on the left side of the first subset (shown in region 704), and a third subset on the right side of the first subset (shown in region 708). For example, referring to FIG. 3D, the first subset may be the electrodes 388-394, the second subset may be the electrodes 384-386, and the third subset may be the electrodes 396-398. The processing system 110 may drive the first through third subsets of electrodes differently. For instance, for the first subset (e.g., electrodes 388-394 shown in region 706), the processing system 110 may perform the CDM coding scheme (e.g., the second or fourth order CDM coding scheme described above), and perform multiple scans (e.g., four scans) based on using the first type of sensing signal for one of the electrodes within the first subset and the second type of sensing signal for the other electrodes. For the second subset (e.g., the electrodes 384-386 shown in region 704) and the third subset (e.g., the electrodes 396-398 shown in region 708), the processing system 110 may provide one type of sensing signal for all of the scans (e.g., the four scans). For instance, the processing system 110 may provide the first type (e.g., positive signal) to the third subset of electrodes and may provide the second type (e.g., negative signal) to the first subset of electrodes. The processing system 110 may obtain profiles (e.g., four profiles) associated with each of the scans. In other words, for the first scan, one of the first subset of electrodes may be driven with a positive sensing signal and the other electrodes of the first subset may be driven with a negative sensing signal. The second subset of electrodes may be driven with the negative sensing signal and the third subset of electrodes may be driven with the positive sensing signal. The processing system 110 may obtain a first profile for the first scan. For the second scan, another of the first subset of electrodes may be driven with a positive sensing signal and the other electrodes of the first subset may be driven with a negative sensing signal. The second subset of electrodes may continue to be driven with the negative sensing signal and the third subset of electrodes may continue to be driven with the positive sensing signal. The processing system 110 may obtain a second profile for the second scan. The third and fourth scans may be performed similarly to obtain third and fourth profiles. As such, the signals for the driven set of electrodes may be denoted as $\vec{T}_{y0}, \vec{T}_{y1}, \vec{T}_{y2}, \ldots \vec{T}_{yi}$ while the signals for the receiving set of electrodes may be denoted as R$_{yo}$, $\vec{R}_{x0}, \vec{R}_{x1}, \vec{R}_{x2}, \ldots \vec{R}_{xi}$.

Figure 8:
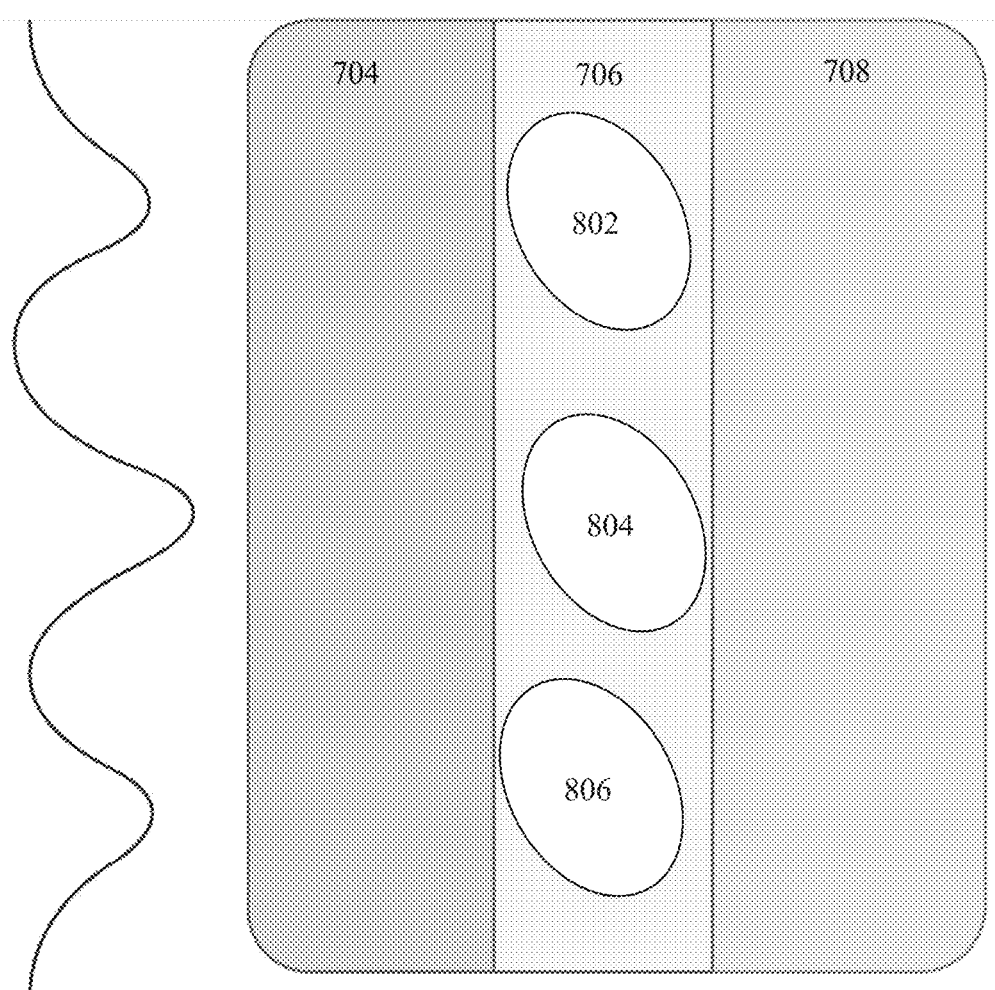

Referring to FIG. 8, the processing system 110 may use the driving scheme shown in illustration 800. This driving scheme is similar to the driving scheme described above in FIG. 7 (e.g., driving the first, second, and third subsets of electrodes shown in regions 704-708 using the first type of signal, the second type of signal, and the CDM coding scheme). As such, by using this driving scheme, the processing system 110 is able to detect three input objects 802-806 including the location of the three input objects 802-806 on both the x-axis and y-axis. For instance, by using the driving scheme described above, the processing system 110 is able to determine the horizontal electrodes that detected the input objects 802-806 using the multiple profiles. Then, in the next frame or iteration, the processing system 110 uses the CDM scheme based on the horizontal electrodes that detected the input objects 802-806. For example, referring to FIG. 3C, the electrodes 356-360, 366-370, and 374-378 may have provided signals indicating the detection of the three input objects 802-806. The processing system 110 may group the horizontal electrodes into subsets of electrodes (e.g., a first subset of electrodes that detected the input objects 802-806 and one or more subsets of electrodes that did not detect the input objects 802-806). The processing system 110 may perform the CDM scheme for the first subset of electrodes and during the scans, may provide a first type of sensing signal to one or more of the first subset of electrodes and the second type to the other electrodes of the first subset. For the one or more other subsets of electrodes, the processing system 110 may continue to drive these electrodes using the first type or the second type throughout the scans.

In some instances, the processing system 110 may perform the CDM scheme and provide the first type of sensing signal to each group of electrodes that detected an input object (e.g., one of the input objects 802-806). For instance, for a first scan, the processing system 110 may provide a positive sensing signal to an electrode from the electrodes 356-360, an electrode from the electrodes 366-370, and an electrode from the electrodes 374-378. The processing system 110 may provide a negative sensing signal to the others within the groups. Then, for a second scan, the processing system 110 may provide a positive sensing signal to three more, different electrodes from the electrodes 356-360, 366-370, and 374-378. The processing system 110 may provide a negative sensing signal to the others, and do the same process for the third scan. The processing system 110 may obtain three profiles based on the three scans.

In some examples, the processing system 110 may perform the CDM scheme and provide the first type of sensing signal to only one electrode of the first subset even though three different groups of electrodes detected the input objects 802-806. For instance, the processing system 110 may provide a positive sensing signal to only one electrode from the electrodes 356-360, 366-370, and 374-378. The processing system 110 may provide a negative sensing signal to the others. The processing system 110 may continue for the other eight scans to obtain nine profiles overall.

Figure 9:
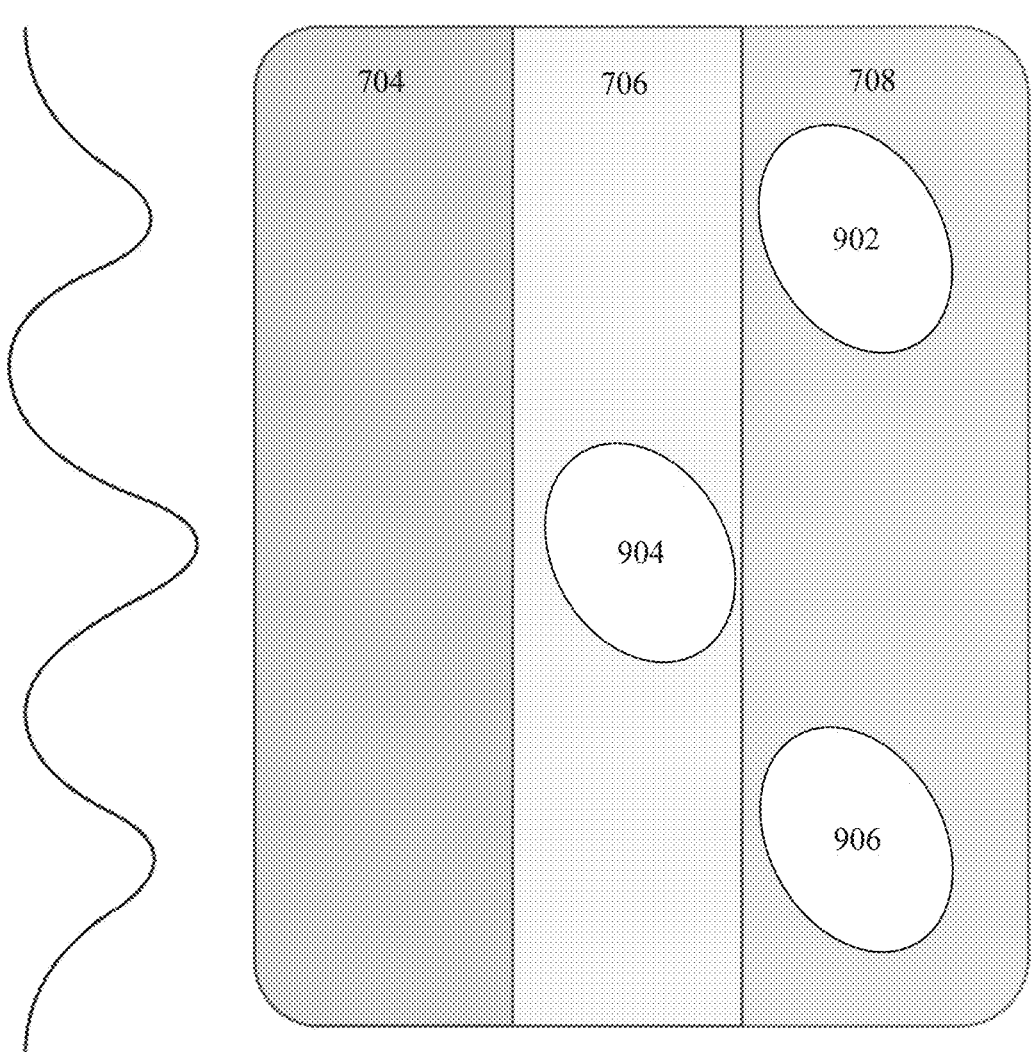

Referring to FIG. 9, the processing system 110 may use the driving scheme shown in illustration 900 (e.g., driving the first, second, and third subsets of electrodes shown in regions 704-708 using the first type of signal, the second type of signal, and the CDM coding scheme). This driving scheme is similar to the driving scheme described above in FIGS. 7 and 8. By using this driving scheme, the processing system 110 is able to detect the location of the three input objects 902-904 on the x-axis and the y-axis.

Figure 10:
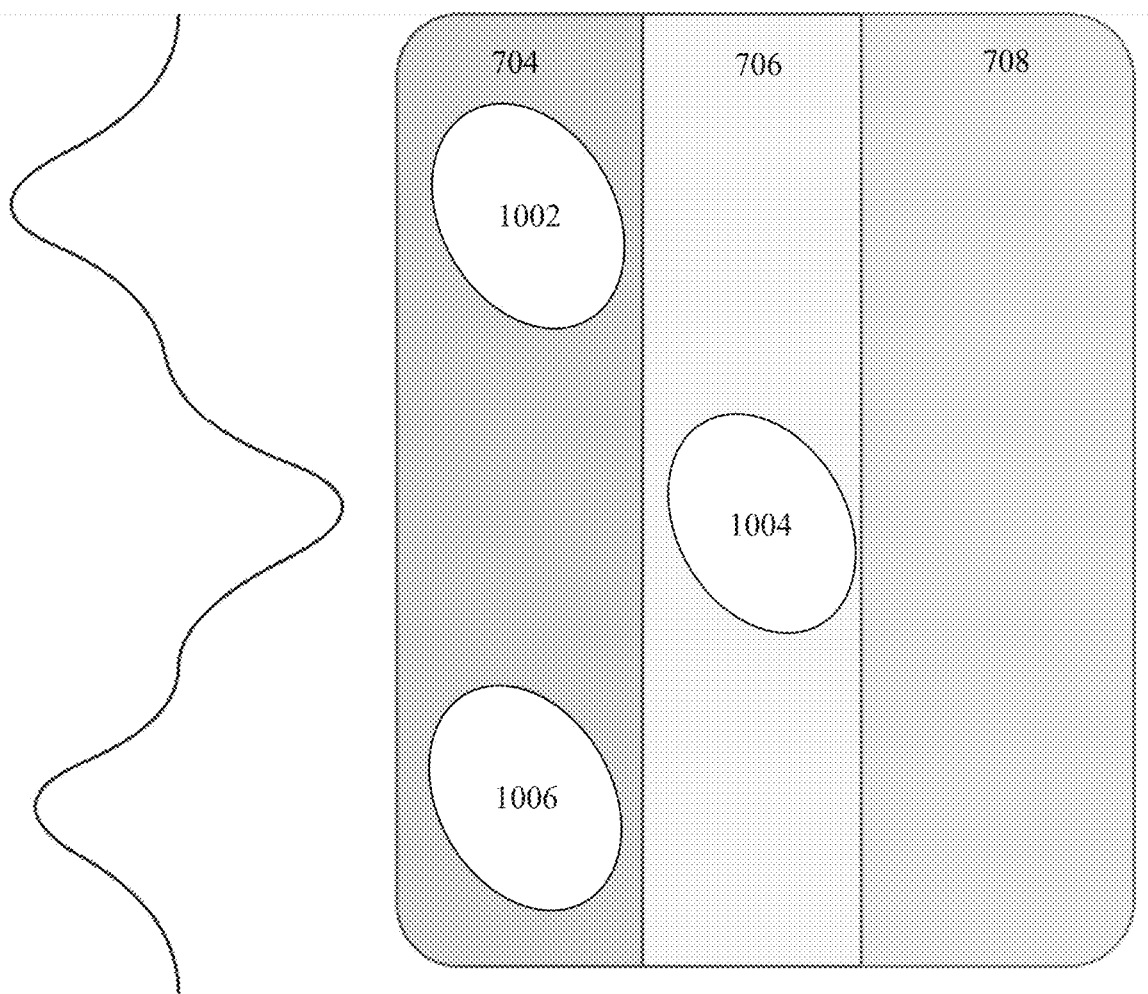

Referring to FIG. 10, the processing system 110 may use the driving scheme shown in illustration 1000. This driving scheme is similar to the driving scheme described above in FIGS. 7 and 8 (e.g., driving the first, second, and third subsets of electrodes shown in regions 704-708 using the first type of signal, the second type of signal, and the CDM coding scheme). By using this driving scheme, the processing system 110 is able to detect the location of the three input objects 1002-1006 on the x-axis and the y-axis.

Figure 11A:
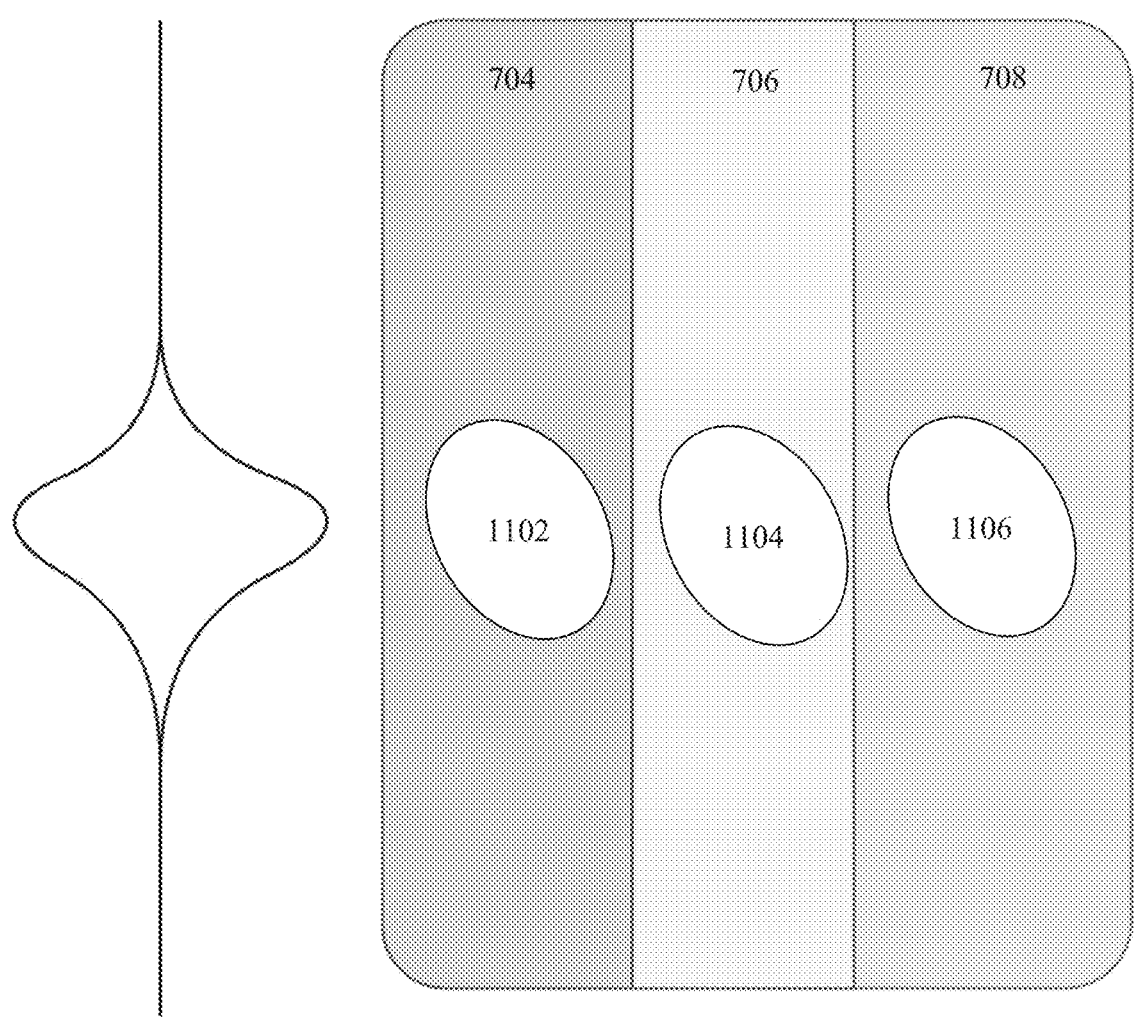
Figure 11B:
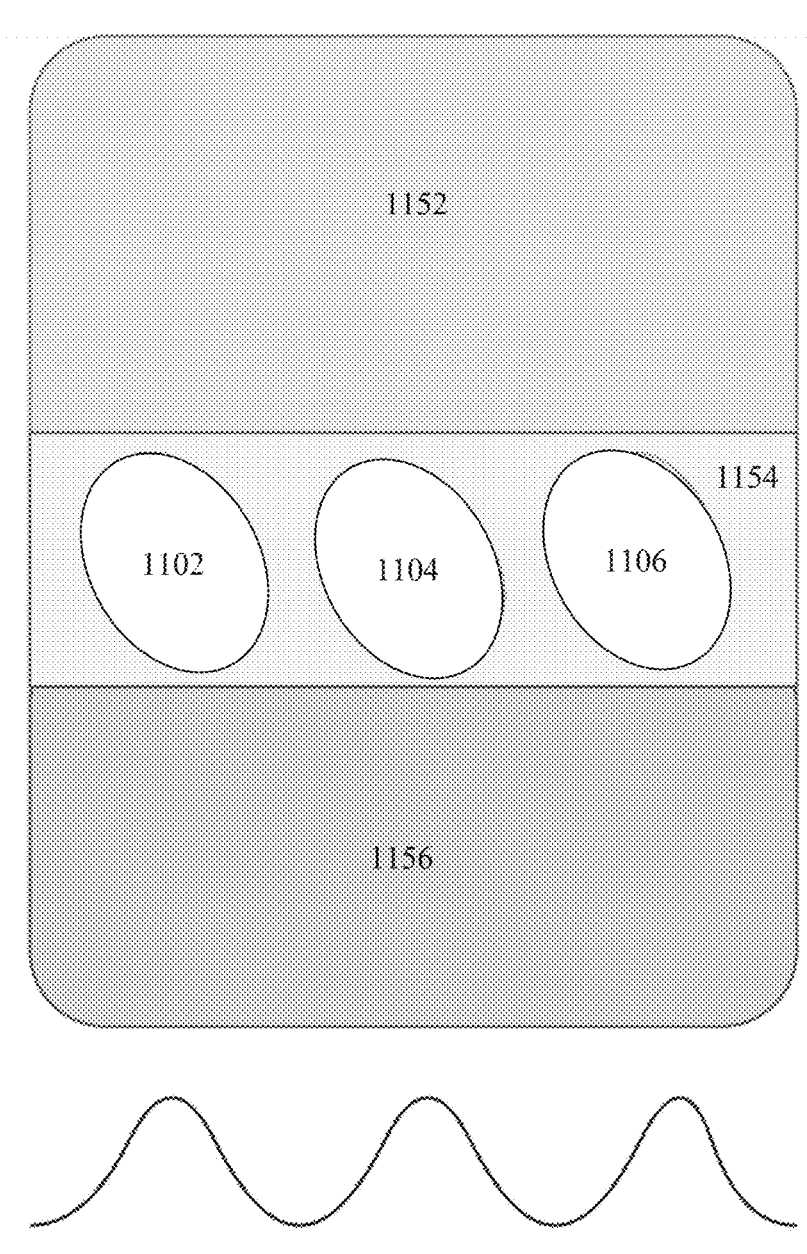

Referring to FIGS. 11A and 11B, the processing system 110 may use the driving scheme shown in illustrations 1100 and 1150. This driving scheme is similar to the driving scheme described above in FIGS. 7 and 8 (e.g., driving the first, second, and third subsets of electrodes shown in regions 704-708 using the first type of signal, the second type of signal, and the CDM coding scheme), but adds another frame with additional CDM scheme. For example, the three input objects 1102-1106 may be positioned in the same line on the y-axis. Performing the CDM scheme for the first subset of electrodes on the y-axis (e.g., the electrodes from the region 706), the processing system 110 obtains one or more profiles that make it difficult to determine the location of input objects as some of the resulting signals may cancel out based on the negative/positive signals. As such, referring to FIG. 11B, the processing system 110 may perform a CDM scheme on the middle horizontal electrodes that detected the input object, and obtain profiles indicating three objects 1102-1106 from the vertical electrodes. The processing system 110 may perform another CDM scheme using the vertical electrodes that detected the three objects 1102-1106. This next CDM scheme allows the processing system 110 to determine that the three input objects 1102-1106 are along the same or substantially the same coordinate on the y-axis. Thus, by adding another frame and performing an additional CDM scheme/axis alternation, the processing system 110 detects the three input objects 1102-1106 on the same or substantially the same line in one of the axes. In other words, the processing system 110 may group the horizontal electrodes into three groups (e.g., a first subset shown in region 1154, a second subset shown in region 1152, and a third subset shown in region 1156). Then, the processing system 110 may drive the three subsets of horizontal electrodes similar to driving the three subsets of vertical electrodes that is described in FIG. 7 and FIG. 11A. For instance, the processing system 110 may drive the first subset of horizontal electrodes that detected the three objects 1102-1106 using a CDM scheme (e.g., the CDM scheme described in FIG. 7). Further, the processing system 110 may drive the second subset with a first type of signal and the third subset with a second type of signal.

Figure 12:
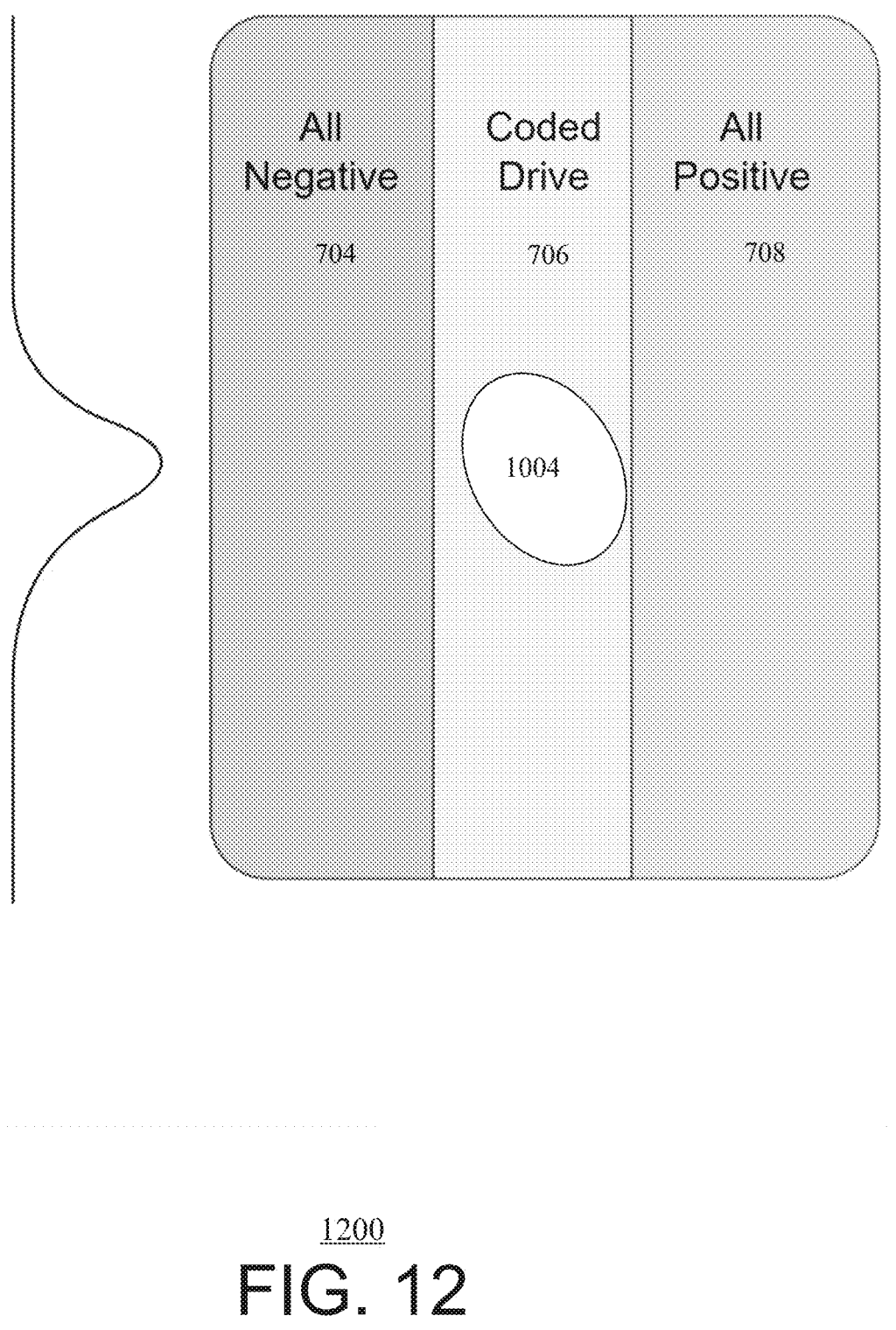

Referring to FIG. 12, the processing system 110 may use the driving scheme shown in illustration 1200. This driving scheme is similar to the driving scheme described above in FIG. 7 (e.g., driving the first, second, and third subsets of electrodes shown in regions 704-708 using the first type of signal, the second type of signal, and the CDM coding scheme). For instance, moving from illustration 1000 of FIG. 10 to illustration 1200 of FIG. 12, the user may remove one or more input objects between frames (e.g., input objects 1002 and 1006). For instance, in illustration 1000, the processing system 110 may detect input objects 1002-1006 (e.g., three of the user's fingers) based on the horizontal electrodes. For instance, referring to FIG. 3C, the processing system 110 may determine that horizontal electrodes 356-360, 366-370, and 374-376 have detected input objects 1002-1006. Subsequently, in the next frame, the processing system 110 may drive the horizontal electrodes 356-360, 366-370, and 374-376 that have detected input objects 1002-1006 using the CDM scheme described above. During the CDM scheme, the processing system 110 may continue to drive the other electrodes using the first type of sensing signal or the second type of sensing signal. Then, the processing system 110 may determine the vertical electrodes that detected the input objects 1002-1006. For example, referring to FIG. 3D, the processing system 110 may determine that vertical electrodes 384-386 and 390-392 detected the input objects 1002-1006. The processing system 110 may drive the vertical electrodes that detected the input objects 1002-1006 using the CDM scheme, and continue to drive the other electrodes using the first type of sensing signal or the second type of sensing signal. This is described above.

Further, the user may remove one or more input objects after a certain point. For instance, after illustration 1000, the user's fingers may be stationary for a particular time interval (e.g., three seconds of pressing down on the screen of the input device 100). Afterwards, the user may lift two fingers, but keep one finger on the screen still. Based on performing the CDM scheme on the horizontal electrodes 356-360, 366-370, and 374-376, the processing system 110 may determine that the vertical electrodes 384-386 no longer detect input object(s) (e.g., the input objects 1002 and 1006). Therefore, referring to FIG. 12 and illustration 1200, the processing system 110 may perform the CDM scheme for the vertical electrodes that still detect an input object 1004 (e.g., vertical electrodes 390-392). For the other electrodes and as mentioned above, the processing system 110 may continue to provide a first type of signal or a second type of signal throughout the CDM scheme.

Figure 14A:
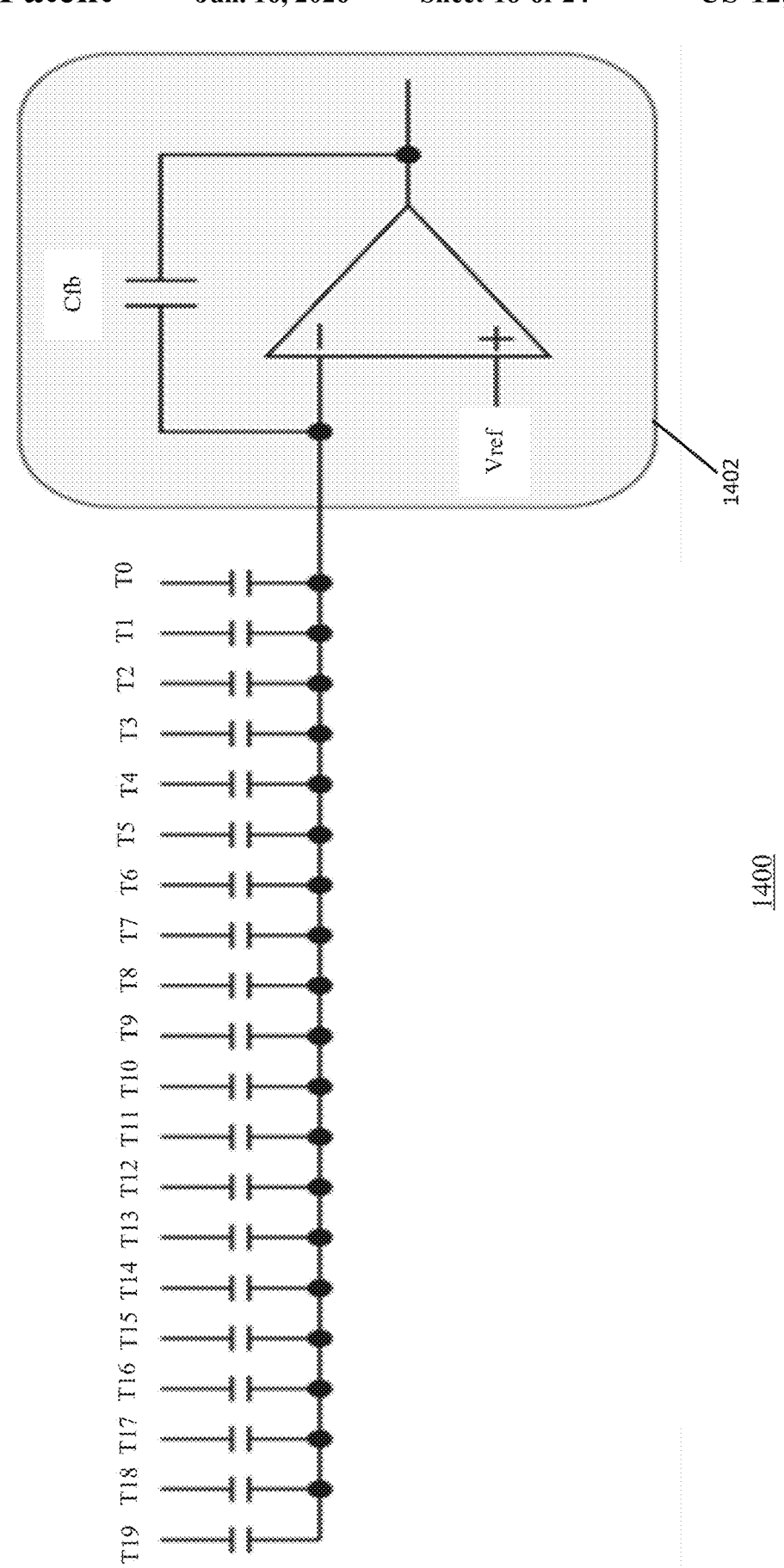
Figure 14B:
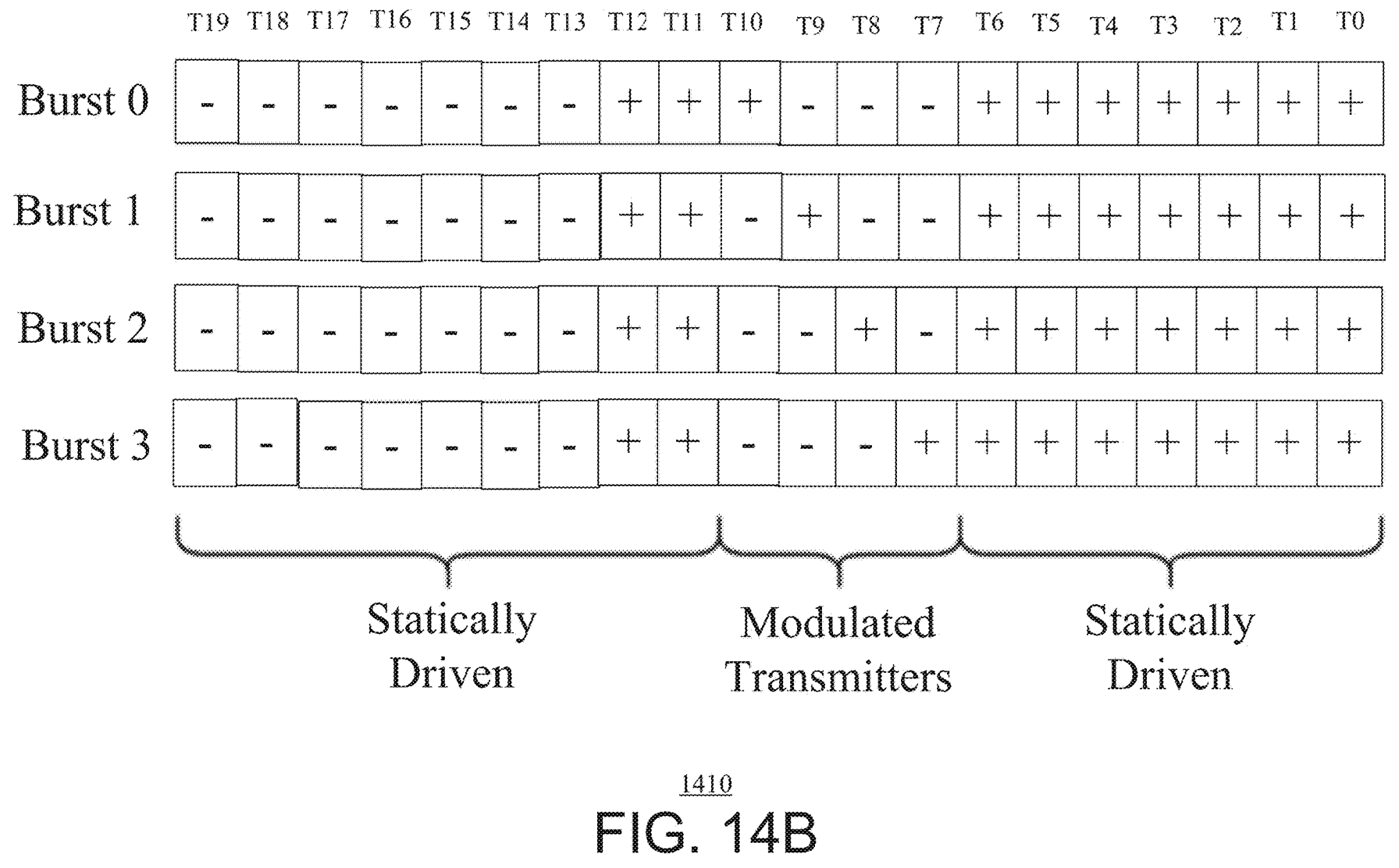
Figure 14C:
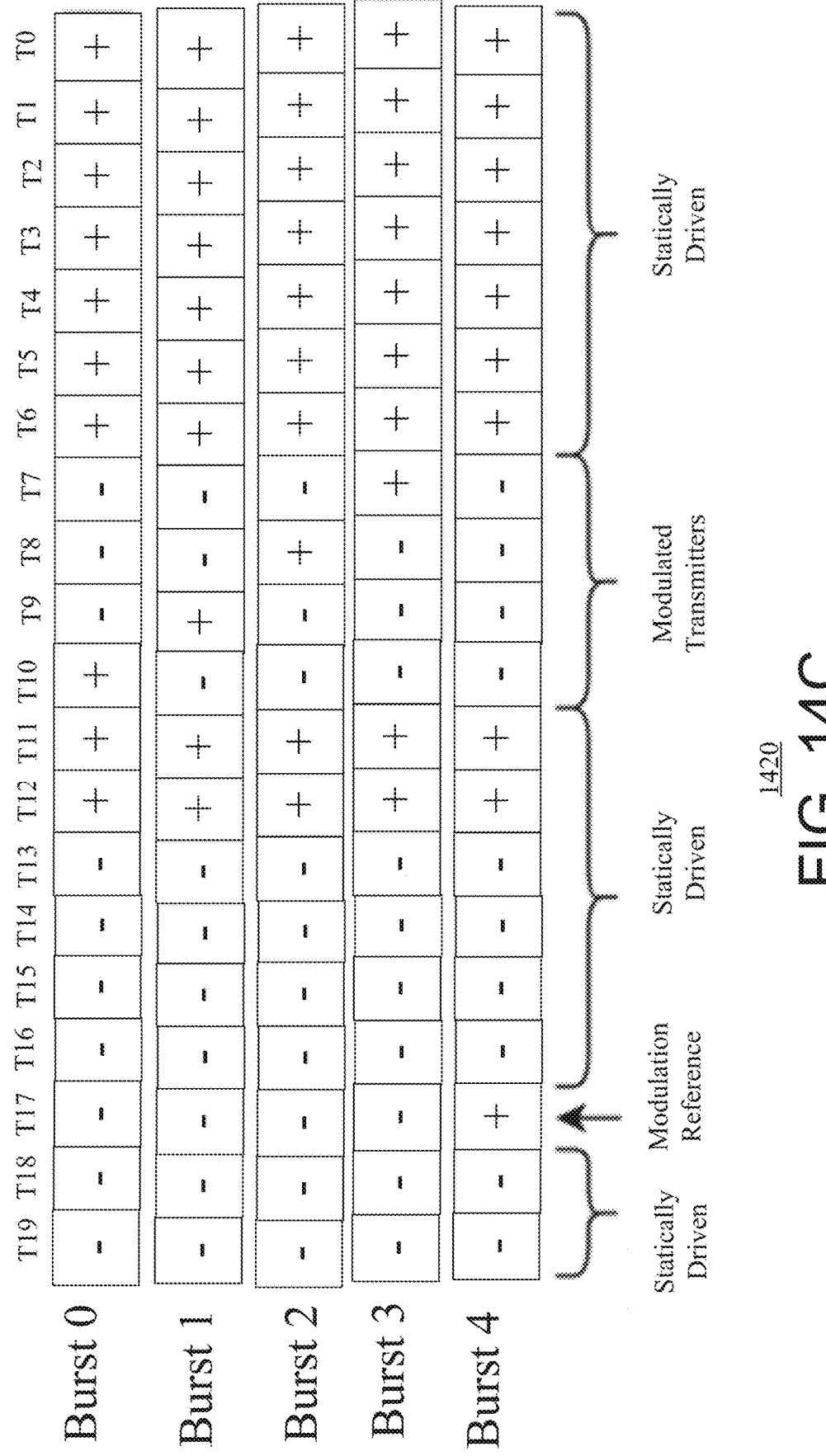

FIG. 13 is a flowchart of an exemplary process for performing a scanning process using a modulation reference according to one or more examples of the present application. The process 1300 may be performed by the input device 100 and in particular, the processing system 110 shown in FIG. 1. However, it will be recognized that an input device that includes additional and/or fewer components as shown in FIG. 1 may be used to perform process 1300, that any of the following blocks may be performed in any suitable order, and that the process 1300 may be performed in any suitable environment. The descriptions, illustrations, and processes of FIG. 13 are merely exemplary and the process 1300 may use other descriptions, illustrations, and processes for performing a scanning process using adaptive scanning. The process 1300 will be described with reference to FIGS. 14A-14C. FIGS. 14A-14C depict illustrations 1400, 1410, and 1420 for performing the scanning process using the modulation reference according to one or more examples of the present application.

For example, in operation, the processing system 110 may perform blocks 1302-1306 similarly to blocks 402-406 described above in FIG. 4. At block 1308, the processing system 110 may incorporate a modulation reference electrode from the second set of electrodes into the first subset. The modulation reference electrode did not detect the input object on the display device. For instance, as mentioned above, the processing system 110 may determine electrodes (e.g., electrodes 390-394 of FIG. 3D) that detected the input object. At block 1306, the processing system 110 may determine the first subset to include only the electrodes 390-394 that detected the input object. Then, at block 1308, the processing system 110 may add another electrode (e.g., a modulation reference electrode such as electrode 386 of FIG. 3D) to the first subset. As such, the first subset may include the electrodes that detected the input object (e.g., electrodes 390 and 392) and an electrode that did not detect the input object (e.g., electrode 386). The processing system 110 may use the first subset of electrodes including the modulation reference electrode in order to reduce noise and interference to the display.

For example, during the CDM scheme, the processing system 110 may seek to provide sensing signals that sum up to be equal to zero or substantially close to zero (e.g., perform a zero row sum). By doing this, the processing system 110 may minimize the noise interference to the display device. As mentioned previously, for the electrodes that detected the input object, the CDM scheme (e.g., order four CDM scheme) may provide a first type of sensing signal (e.g., positive sensing signal) for one electrode within the first subset and a second type of sensing signal (e.g., negative sensing signal) to the other electrodes within the first subset. For the other electrodes that are not within the first subset, the processing system 110 may continue to provide the first type of sensing signal or the second type of sensing signal throughout the CDM scheme. By performing zero sum, the processing system 110 may determine a second subset and a third subset from the other electrodes and provide the first type of sensing signal to the second subset and the second type of sensing signal to the third subset. The second and third subsets of electrodes may be split such that there are the same or substantially the same number of electrodes from the entire second set of electrodes that are provided with the first type of sensing signal and the second type of sensing signal.

For instance, referring to FIG. 3C, the processing system 110 may determine that electrodes 364-370 detected an input object, and determine the first subset to include these electrodes 364-370. Using the CDM scheme, the processing system 110 may use four scans (e.g., bursts) and for each of the scans, the processing system 110 may provide a single electrode with a first type of signal (e.g., positive signal) and the other electrodes with the second type of signal (e.g., negative signal). As such, for these electrodes, the processing system 110 provides one electrode with a first type of signal and three electrodes with a second type of signal. For the remaining electrodes (e.g., electrodes 352-362 and 372-382), the processing system 110 may categorize these remaining electrodes into the second and third subsets such that the overall number of electrodes (e.g., electrodes 352-382) that are provided with the first and second types of sensing signals are even or substantially even. For instance, the processing system 110 may categorize the electrodes 352-362 and 370 into the second subset and the electrodes 372-382 into the third subset. The processing system 110 may continuously provide the first type of signal (e.g., positive signal) to the second subset (e.g., electrodes 352-362 and 370) and continuously provide the second type of signal (e.g., negative signal) to the third subset (e.g., electrodes 372-382). By determining the first through third subsets and providing the first and second type of signals, eight electrodes are provided with the first type of sensing signal and eight electrodes are provided with the second type of sensing signal. Thus, these electrodes even out to provide a zero row sum.

However, in some examples, the processing system 110 may have to use a further electrode to be able to determine the location of the input object. For instance, during the first and second scans, the receiver electrodes (e.g., electrode 384 of FIG. 3D) obtain resulting signals based on driving the transmitter electrodes (e.g., the first through third subsets of electrodes described above). Two resulting signals are obtained at each received electrode such as electrode 384. The processing system 110 may subtract the results from the first scan with the results from the second scan, and two variables are unknown (e.g., all of the other electrodes other than the electrode from the first subset of electrodes would be equal to zero given the subtraction, but the two electrodes that were provided the first type of sensing signal would still remain as variables and a single equation is determined). For instance, for the first scan, an electrode from the first subset (e.g., a variable for the electrode 364) is provided a positive signal. In the second scan, another electrode from the first subset (e.g., a variable for the electrode 366) is provided a positive signal. The remaining electrode values are the same during the first and second scans. Given the change of providing the electrodes 364 and 366 with positive/negative signals (e.g., positive for electrode 364 during the first scan and negative for this electrode 364 during the second scan, and vice versa for the electrode 366) and by subtracting the variables from the first/second scans, the only remaining signals are the two unknowns (e.g., variables Tx associated with the electrodes 364 and 366). But, there is only one equation. Similarly, by performing the third scan and subtracting, the processing system 110 identifies three unknowns (e.g., the variables Tx associated with the electrodes 364-368), but two equations. Performing the fourth scan also includes this issue. Because of this, the processing system 110 may generate a matrix associated with the profiles where each row is associated with a scan/equation, but may be unable to solve the matrix.

As such, the processing system 110 performs block 1308 and incorporates a modulation reference electrode into the first subset. This processing system 110 determines that an electrode from the second set of electrodes did not detect an input object (e.g., electrode 356 of FIG. 3C), sets this electrode as the modulation reference electrode, and includes this electrode within the first subset. During the CDM scheme, the processing system 110 performs another scan/burst that changes the type of signal provided to this modulation reference electrode (e.g., four scans may use the second type of signal (negative sensing signal) and the other scan may use the first type of signal (positive sensing signal)). Thus, the processing system 110 obtains another profile associated with this scan. Because the processing system 110 determined that this modulation reference electrode did not detect an electrode, the processing system 110 may set the value of this modulation reference electrode based on a modulation reference value (e.g., zero or a known/determined/pre-defined offset). Therefore, because the processing system 110 sets the value of this modulation reference electrode as a known value (e.g., the modulation reference value), the processing system 110 now obtains as many unknown variables as equations (e.g., four unknown variables associated with the four electrodes 364-370 that detected the input object, and four equations with the last equation being based on the fifth scan associated with the modulation reference electrode being provided with the first type of signal). The processing system 110 solves the equations to determine the variables, and determines the location of the input object based on solving the equations.

This is described in the illustrations shown in FIGS. 14A-14C. For instance, referring to FIG. 14A, illustration 1400 shows twenty transmitter electrodes T0 through T19. Each of the twenty transmitter electrodes T0-T19 may be driven by a voltage $V_i$. Further, there may be a capacitive coupling the transmitter electrodes T0-T19 to the receiver electrodes, and a receiver electrode circuit 1402. The receiver circuit 1402 aggregates the charge obtained from the twenty transmitters to produce a single measurement. For instance, this may be shown using the following expression:

$$r = \frac{1}{C_{fb}}\sum_{i=0}^{19} V_i C_i$$

where r is the aggregated charge obtained from the receiver circuit 1402, $C_{fb}$ is the capacitor from the receiver circuit 1402, $V_i$ is the voltage that is driving each of the twenty transmitter electrodes T0-T19, and $C_i$ is the capacitive coupling between one of the transmitter electrodes $T_i$ and the receiver electrode. Thus, the charge $Q_i$ may be equal to the capacitive coupling $C_i$ multiplied by the voltage $V_i$.

Referring to FIG. 14B, illustration 1410 shows the CDM scheme using the first subset of electrodes from block 1306 (e.g., only the electrodes that detected the input object). For instance, electrodes 7-10, associated with T7-T10, detected the input object and are modulated during the CDM scheme, and the rest of the electrodes are statically driven during the CDM scheme. The four bursts (burst 0 to burst 3) show the four scans of the CDM scheme based on four electrodes detecting the input object.

For instance, the four bursts (burst 0 to burst 3) may have the following aggregated charges $r_0$ to $r_3$.

$$r_0 = Q_{10} - Q_9 - Q_8 - Q_7 + G$$
$$r_1 = -Q_{10} + Q_9 - Q_8 - Q_7 + G$$
$$r_2 = -Q_{10} - Q_9 + Q_8 - Q_7 + G$$
$$r_3 = -Q_{10} - Q_9 - Q_8 - Q_7 + G$$

$$G = Q_0 + Q_1 + Q_2 + Q_3 + Q_4 + Q_5 + Q_6 + Q_{11} + Q_{12} - Q_{13} - Q_{14} - Q_{15} - Q_{16} - Q_{17} - Q_{18} - Q_{19}$$

where $r_0$-$r_3$ are the aggregated charges for each of the four bursts and $Q_i$ represents a charge associated with a transmitter electrode (e.g., $Q_0$ is the charge associated with transmitter electrode $T_0$ and $Q_5$ is the charge associated with the transmitter electrode $T_5$).

But, as mentioned above, using this CDM scheme may lead to the processing system 110 being unable to solve for the variables associated with electrodes 7-10. For instance, the matrix below demonstrates this challenge. For example, if the aggregate of the statically driven electrodes is unknown, then there are five unknowns ($Q_7$ to $Q_{10}$ and G) for four measurements ($r_0$ to $r_3$).

$$\begin{bmatrix} r_0 \\ r_1 \\ r_2 \\ r_3 \end{bmatrix} = \begin{bmatrix} 1 & -1 & -1 & -1 & 1 \\ -1 & 1 & -1 & -1 & 1 \\ -1 & -1 & 1 & -1 & 1 \\ -1 & -1 & -1 & 1 & 1 \end{bmatrix} \begin{bmatrix} Q_{10} \\ Q_9 \\ Q_8 \\ Q_7 \\ G \end{bmatrix}$$

Referring to FIG. 14C, illustration 1420 shows the CDM scheme using the first subset of electrodes from block 1308 (e.g., the electrodes that detected the input object and a further modulation reference electrode, which is shown as the electrode 17 associated with T17). For instance, five bursts may be used, and the five bursts (burst 0 to burst 4) may have the following aggregated charges $r_0$ to $r_3$:

$$r_0 = Q_{10} - Q_9 - Q_8 - Q_7 - Q_{17} + G$$
$$r_1 = -Q_{10} + Q_9 - Q_8 - Q_7 - Q_{17} + G$$
$$r_2 = -Q_{10} - Q_9 + Q_8 - Q_7 - Q_{17} + G$$
$$r_3 = -Q_{10} - Q_9 - Q_8 - Q_7 - Q_{17} + G$$

-continued $$r_3 = -Q_{10} - Q_9 - Q_8 - Q_7 + Q_{17} + G$$

$$G = Q_0 + Q_1 + Q_2 + Q_3 + Q_4 + Q_5 +$$
$$Q_6 + Q_{11} - Q_{12} - Q_{13} - Q_{14} - Q_{15} - Q_{16} - Q_{18} - Q_{19}$$

This leads to the following matrix and calculations:

$$\begin{bmatrix} r_0 \\ r_1 \\ r_2 \\ r_3 \\ r_4 \end{bmatrix} = \begin{bmatrix} 1 & -1 & -1 & -1 & -1 & 1 \\ -1 & 1 & -1 & -1 & -1 & 1 \\ -1 & -1 & 1 & -1 & -1 & 1 \\ -1 & -1 & -1 & 1 & -1 & 1 \\ -1 & -1 & -1 & -1 & 1 & 1 \end{bmatrix} \begin{bmatrix} Q_{10} \\ Q_9 \\ Q_8 \\ Q_7 \\ Q_{17} \\ G \end{bmatrix}$$

$$r_0 - r_4 = 2(Q_{10} - Q_{17})$$

$$r_1 - r_4 = 2(Q_9 - Q_{17})$$

$$r_2 - r_4 = 2(Q_8 - Q_{17})$$

$$r_3 - r_4 = 2(Q_7 - Q_{17})$$

If $Q_{17} = 0$, then $$Q_{10} = \frac{r_0 - r_4}{2}$$

$$Q_9 = \frac{r_1 - r_4}{2}$$

$$Q_8 = \frac{r_2 - r_4}{2}$$

$$Q_7 = \frac{r_3 - r_4}{2}$$

As indicated above, the challenge still persists. However, because of the axis alternation sensing scheme, it is known where T17 includes a signal. If it does, then another reference is chosen instead. Based on this, the processing system 110 is able to solve for the variables T7-T10 given that it knows the modulation reference value for T17. The processing system 110 determines the variables T7-T10 using the five equations, and determines the location of the input object. In particular, the last measurement can be subtracted from the preceding four measurements. If the value associated with T17 is known and specifically zero and/or a known offset, then the values for the other measurements are immediately determinable by processing system 110.

In other words, for the zero row sum, because the capacitive sensor strongly couples to the display and may interfere with the operation, it is desirable to minimize this coupling by optimizing the driving phase. For instance, for a transmitting group of the capacitive sensors, the processing system 110 may provide first and second types of driving signals such that the sum of the individual transmitter drives forms an aggregate. For the regions devoid of a signal, the processing system 110 chooses the voltage stimulation (e.g., the first/second types of driving signals) to minimize the effects of the voltage stimulation in the regions comprising the signal. For instance, referring to FIGS. 14B and 14C, the transmitter electrodes being provided the first type of signal (e.g., positive signal) and the transmitter electrodes being provided the second type of signal (e.g., negative signal) would be equal, and the sum of the positive and negative charges would equal substantially zero. For example, at burst zero, ten electrodes (e.g., T0-T6 and T10-T12) are provided with the positive signal and ten electrodes (e.g., T7-T9 and T13-T19) are provided with the negative signal. As such, the sum of these driven signals would be equal to zero, causing the processing system 110 to perform a zero row sum. Similarly, at burst four of FIG. 14C, ten electrodes (e.g., T0-T6, T11, T12, and T17) are provided with the positive signal and ten electrodes (e.g., T7-T10, T13-T16, T18, and T19) are provided with the negative signal. As such, the sum of these driven signals would also be equal to zero. Therefore, during each of the bursts/scans, the processing system 110 drives the transmitter electrodes (e.g., the first or second set of electrodes depending on the axis alternation) using a zero row sum (e.g., the transmitter electrodes being driven with a positive sensing signal would equal the transmitter electrodes being driven with a negative sensing signal such that the sum of the values of the sensing signals would equal substantially zero).

The processing system 110 may use the zero row sum for at least the following reasons. First, it may minimize the interference to the display for the case when the 2D sensor is above a display. Second, it may minimize the far field radiated emissions. Third, it may minimize the charge driven into the receiver. Traditionally, a reason existing systems did not implement zero row sum may be due to the indeterminacy in the system of equations (e.g., indeterminate systems of equations solved through some sort of regularization such as Tikhonov regularization). However, as described above, by using the modulation reference electrode, the processing system 110 exploits the sample rate and knows with confidence when electrodes are devoid of signal. This introduces a "known" term to the set of unknowns and allows the set of equations to be solved, which is described above. Additionally, and/or alternatively, as described above, the processing system 110 may use the modulation reference signal even when the row sum is non-zero (e.g., the transmitter electrodes being driven with a positive sensing signal does not equal the transmitter electrodes being driven with a negative sensing signal such that the sum is not equal to substantially zero).

Returning back to FIG. 13, at block 1310, the processing system 110 drives the first subset of the second set of electrodes using CDM coding scheme to generate second sensing signals. At each scan of the CDM coding scheme, a single electrode from the first subset is driven with a first type of sensing signal (e.g., positive signal) and the other electrodes from the first subset is driven with a second type of sensing signal (e.g., negative signal). At block 1312, the processing system 110 obtains second resulting signals associated with the second sensing signals.

Figure 15:
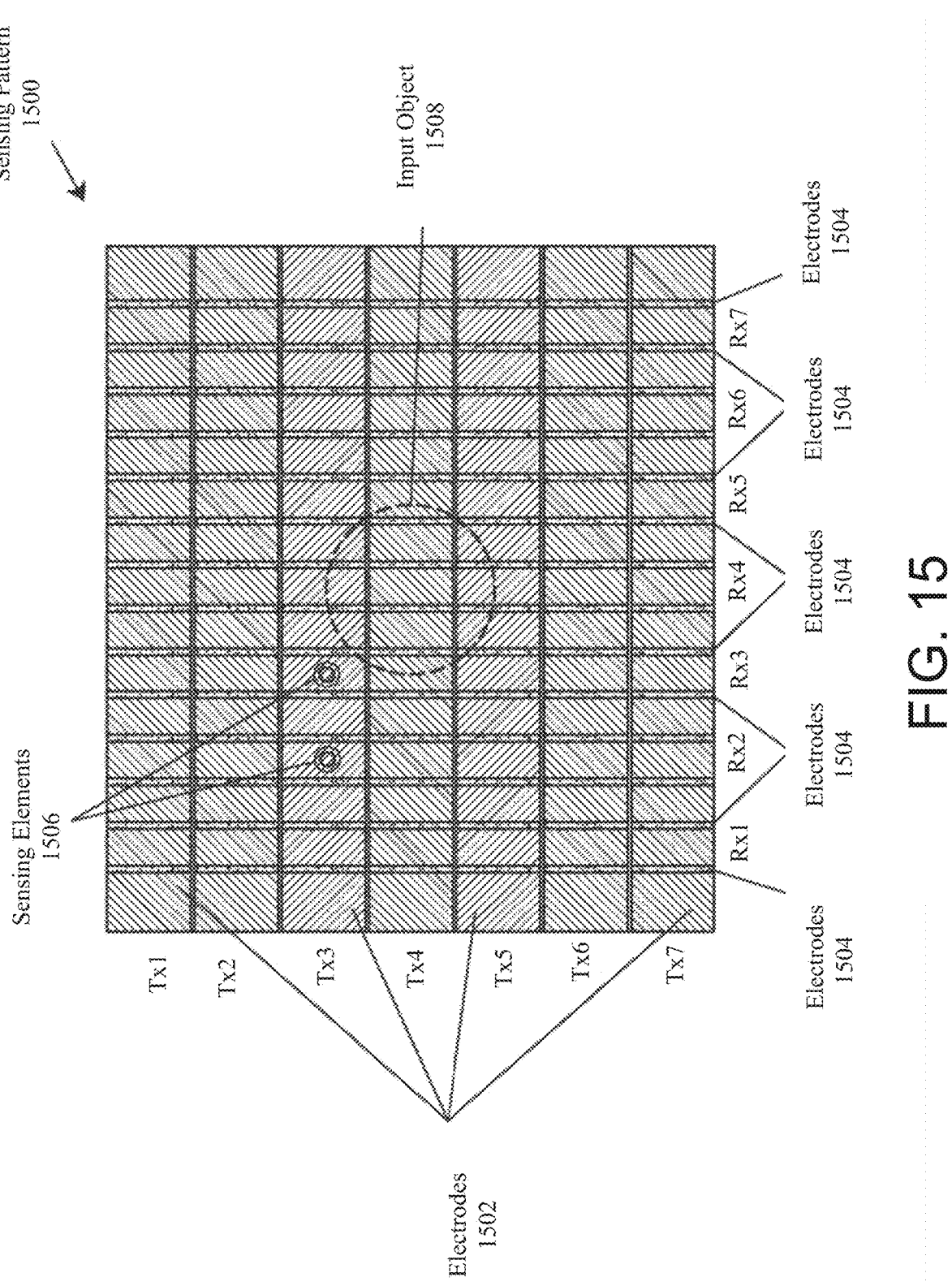
FIG. 15 depicts a sensing pattern that is used by an exemplary input device according to one or more examples of the present application.

FIG. 15 depicts a sensing pattern 1500 that is used by an exemplary computing device (e.g., the input device 100) according to one or more examples of the present application. For instance, a sensing pattern 1500 may be used by a computing device, such as input device 100, that comprises electrodes 1502 (e.g., transmitter (Tx) electrodes) that are on a first axis (e.g., y-axis) and electrodes 1504 (e.g., receiver (Rx) electrodes) that are on a second axis (e.g., x-axis). While the electrodes on the y-axis (the electrodes 1502) are shown as transmitter electrodes and the electrodes on the x-axis (the electrodes 1504) are shown as receiver electrodes, this is merely an example. In other words, each of the electrodes 1502 and 1504 may be capable of being transmitter electrodes as well as receiver electrodes. As such, instead of the electrodes being bar electrodes that intersect with each other, as described above in FIGS. 3A-3D (e.g., the vertical electrodes 304 and horizontal electrodes 302 of FIG. 3A), in other examples, the input device 100 may include and/or use a sensing pattern 1500 that includes the electrodes 1502 and 1504 (e.g., transmitter and receiver electrodes) that do not intersect with each other.

Referring to the sensing pattern 1500, the sensor pattern includes rows of electrodes 1502 (e.g., transmitter electrodes Tx1-Tx7) and columns of receiver electrodes 1504 (e.g., receiver electrodes Rx1-Rx7). In the sensor pattern 1500, the electrodes 1502 have a rectangular shape and the electrodes 1504 include two separate, thinner electrode elements instead of a single wider electrode element. The use of two thinner receiver electrode elements per electrode 1504 results in a reduced capacitive coupling to an input object 1508 (e.g., a finger) thereby providing superior low ground mass (LGM) characteristics. In other examples, the electrodes 1504 may include single wider electrode elements, analogous to the electrodes 1502. Generally, electrodes of any shape and with any number of prongs may be used as the electrodes 1502 and 1504. For instance, additional shapes and/or prongs of electrodes 1502 and 1504, including further functionality of the sensing pattern 1500 as well as other sensing patterns, are described in U.S. Pat. No. 11,635,848 (the '848 Patent), titled "Low ground mass correction for capacitive imaging sensors," filed on Jul. 28, 2021, which is incorporated by reference in its entirety herein.

The electrodes 1502 and 1504 may be used in capacitance sensing including absolute capacitance sensing, transcapacitance sensing, cis-capacitance, and/or mutual capacitance sensing.

In some variations, the electrodes 1502 and the electrodes 1504, together, implement mutual capacitance or transcapacitance sensing. At the intersection of an electrode 1502 and an electrode 1504, a localized capacitive coupling is formed between a portion of the electrode 1502 and the electrode 1504. The region of this localized capacitive coupling may be termed a "capacitive pixel," or also referred to herein as the sensing element 1506. A transcapacitance Ct is associated with the sensing element 1506. When an input object 1508 approaches the sensing element 1506, the transcapacitance Ct may change by an amount ΔCt. A presence or absence of the input object 1506 may thus be detected by monitoring ΔCt. ΔCt may be measured by driving a waveform onto an electrode 1502 (e.g., transmitter electrode) and receiving a resulting signal from the electrode 1504 (e.g., receiver electrode). The resulting signal is a function of the waveform and ΔCt due to the presence of an input object 1508. Alternatively, a transcapacitance sensing may also be performed between two electrodes 1502 or between two receiver electrodes 1504. In other words, a mutual capacitance between non-crossing electrodes may be obtained between two transmitter electrodes 1502 or between two receiver electrodes 1504. A ΔCt may be obtained for multiple sensing elements to generate a capacitive image (e.g., spanning the entire sensing region).

In other words, mutual capacitance or transcapacitance sensing may involve driving a first set of electrodes on a first axis (e.g., y-axis) and measuring the resulting signals from a second set of electrodes that are on the other axis (e.g., x-axis). For instance, the electrodes 1502 on the y-axis may be driven, and the electrodes 1504 that are across or on the other edge/axis from the electrodes 1502 (e.g., the electrodes 1504 on the x-axis) may obtain the resulting signals. In contrast, for cis-capacitance, the transmitter and receiver electrodes may be on the same axis. For instance, when performing a cis-capacitance sensing scheme, the electrodes 1502 may be used as both the transmitter electrodes and also the receiver electrodes. For example, one or more of the electrodes 1502 (e.g., one or more of the electrodes Tx1-Tx7) may be driven, and the other electrodes on the same axis as the driven electrodes 1502 (e.g., the other electrodes Tx1-Tx7) may be used to obtain a resulting signal. For instance, to obtain a cis-capacitance profile for the electrodes 1502, the Tx1 electrode 1502 may be driven and the other Tx1-Tx7 electrodes 1502 may be the receiver electrodes that obtain resulting signals. Then, the Tx2 electrode 1502 may be driven and the other Tx1-Tx7 electrodes 1502 may be the receiver electrodes that obtain the resulting signals. This may repeat such that each of the electrodes 1502 are driven in turn to obtain the resulting signals. Similarly, the electrodes 1504 may also be used as both the transmitter electrodes and the receiver electrodes to perform a cis-capacitance sensing scheme. For example, to obtain a cis-capacitance profile for the electrodes 1504, one or more of the electrodes 1504 (e.g., one or more of the electrodes Rx1-Rx7) may be driven, and the other electrodes 1504 (e.g., the other electrodes Rx1-Rx7) may be used as receiver electrodes to obtain a resulting signal. This may repeat and the other electrodes 1504 may be driven to obtain additional resulting signals. The differences between performing cis-capacitance sensing and transcapacitance sensing are described in further detail in FIGS. 16A and 16B.

Figure 16A:
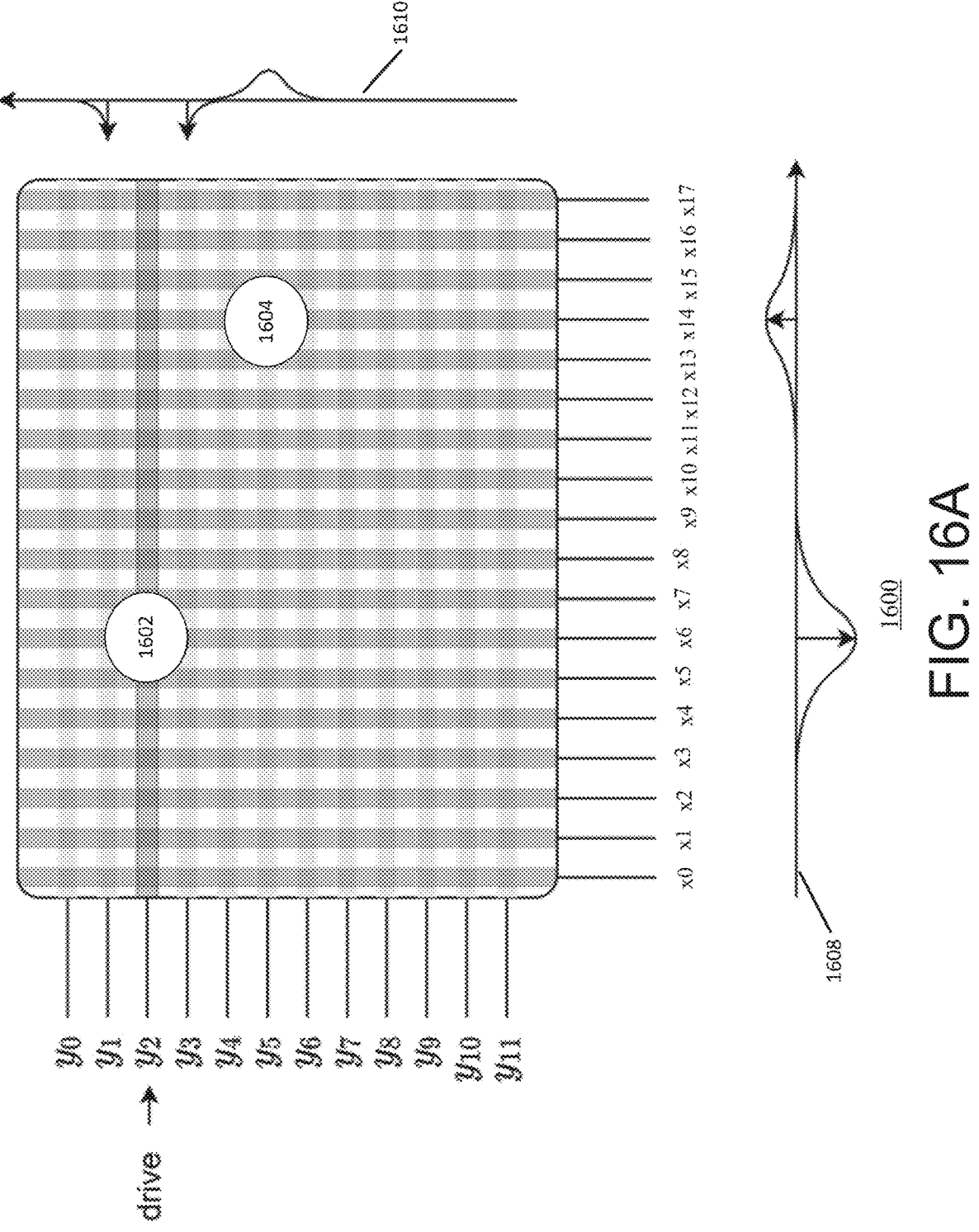
FIGS. 16A and 16B depict performing transcapacitance sensing and cis-capacitance sensing according to one or more examples of the present application.
Figure 16B:
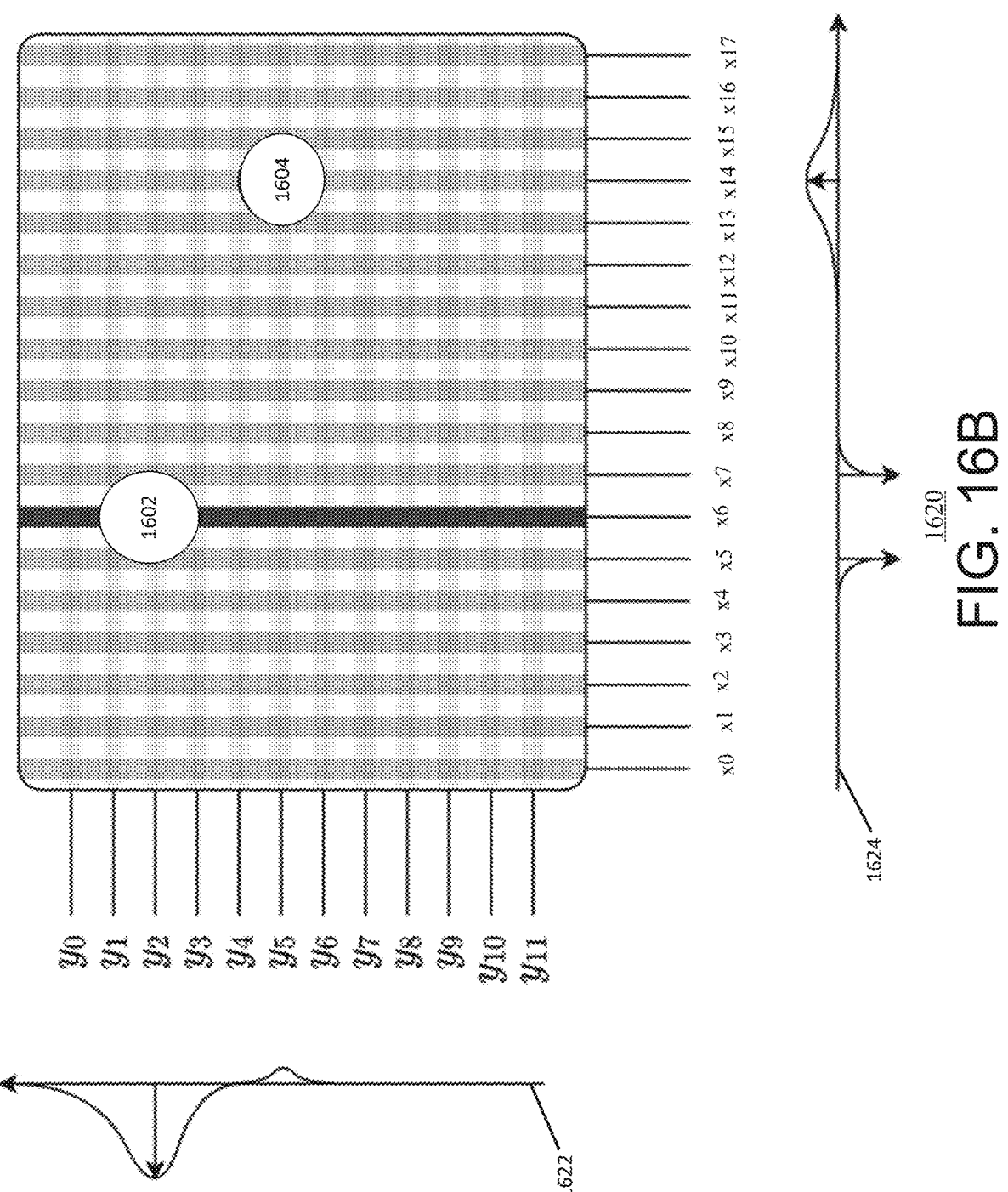

FIGS. 16A and 16B depict illustrations for performing transcapacitance sensing and cis-capacitance sensing according to one or more examples of the present application. For example, FIG. 16A shows an illustration 1600 for driving an electrode on the y-axis (electrode y2) and the resulting signals obtained based on performing transcapacitance sensing and cis-capacitance sensing. For example, two input objects 1602 and 1604 are shown in illustration 1600. Furthermore, a first set of electrodes y0 to y11 are shown on a first axis (e.g., y-axis) and a second set of electrodes x0-x17 are shown on a second axis (e.g., x-axis). The processing system 110 drives a first electrode y2 on the first axis. Then, based on performing transcapacitance sensing or cis-capacitance sensing, two profiles 1608, 1610 of resulting signals are obtained. For example, based on performing transcapacitance sensing, the resulting signals are obtained from the second axis of electrodes x0-x17, and the profile 1608 shows the resulting signals from the second axis of electrodes x0-x17. Based on performing cis-capacitance sensing, the resulting signals are obtained also from the first axis of electrodes (e.g., the resulting signals are obtained from the electrodes y0-y11), and the profile 1610 shows the resulting signals from these electrodes y0-y11.

Similarly, FIG. 16B shows an illustration 1620 for driving an electrode on the x-axis (electrode x6) and the resulting signals obtained based on performing transcapacitance sensing and cis-capacitance sensing. For instance, the illustration 1620 also shows the two input objects 1602 and 1604. Based on performing transcapacitance sensing, the resulting signals are obtained from the other axis of electrodes y0-y11, and the profile 1622 shows the resulting signals from the other axis of electrodes y0-y11. Based on performing cis-capacitance sensing, the resulting signals are obtained also from the same axis of electrodes (e.g., the resulting signals are obtained from the electrodes x0-x17), and the profile 1624 shows the resulting signals from these electrodes x0-x17.

In other words, in transcapacitance sensing, the input objects (e.g., input objects 1602 and 1604) shunts the driving electrode's electric field to ground—at least to the degree that the input object shares a ground with the sensing system (e.g., the input device 100). The receiver electrodes perceive this as a drop in the signal. As such, the transcapacitance profiles 1608 and 1624 are shown as negative for the input object 1602. If the input object 1602 coupling to the sensor's ground is weak, then a portion of current/charge finds a return path through the second input object 1604, and back into the sensor. This is a parasitic LGM effect and is shown as a positive signal in profiles 1608 and 1624 because there is an increase in the charge being detected by the associated receiver electrodes in the vicinity of the input object 1604. In cis-capacitance sensing, the input object 1602 still shunts the driving electrode's electric field to ground. This is shown by the adjacent parallel electrodes in the cis-capacitance profiles being negative (e.g., electrodes y1 and y3 in FIG. 16A and electrodes x5 and x7 in FIG. 16B). If the input object 1602 is well coupled to the sensor ground (e.g., low LGM), then all current driven into the input object 1602 returns to ground and none passes into the input object 1604. However, if the input object 1602 is poorly coupled to the sensor ground, then a portion of current returns to the sensor through the input object 1604. The signal is positive because similar to the transcapacitance case, the signal increases the charge seen by the receiver electrodes in the vicinity of the input object 1604.

FIG. 17 is another flowchart of an exemplary process 1700 for performing a scanning process using adaptive scanning according to one or more examples of the present application. The process 1700 may be performed by the input device 100 and in particular, the processing system 110 shown in FIG. 1. However, it will be recognized that an input device that includes additional and/or fewer components as shown in FIG. 1 may be used to perform process 1700, that any of the following blocks may be performed in any suitable order, and that the process 1700 may be performed in any suitable environment. The descriptions, illustrations, and processes of FIG. 17 are merely exemplary and the process 1700 may use other descriptions, illustrations, and processes for performing a scanning process using adaptive scanning.

In operation, at block 1702, the processing system 110 of an input device 100 (e.g., a computing device) drives one or more of a plurality of electrodes to generate first sensing signals. At block 1704, the processing system 110 obtains first resulting signals associated with the first sensing signals. For instance, referring to FIG. 15, the processing system 110 may drive one or more of the electrodes 1502 and/or 1504 using any capacitance sensing scheme including absolute capacitance sensing, transcapacitance sensing, cis-capacitance, and/or mutual capacitance sensing. The processing system 110 may then obtain resulting signals from one or more of the electrodes 1502 and/or 1504 based on performing the capacitance sensing scheme. For example, as mentioned above in FIG. 5 and step 510, the processing system 110 may perform a spatial scan by driving a first set of electrodes to generate sensing signals and obtain resulting signals from a second set of electrodes. In transcapacitance sensing, the first set of electrodes may be on a first axis and second set of electrodes may be a second axis (e.g., the electrodes 1502 may be the transmitter electrodes and the electrodes 1504 may be the receiver electrodes). In cis-capacitance sensing, the first and second set of electrodes may be on the same axis, which is described above.

At block 1706, the processing system 110 determines a first subset of the plurality of electrodes based on detecting an input object on a display device using the first resulting signals. For instance, referring to FIGS. 16A and 16B, the processing system 110 may determine magnitudes based on the first resulting signals and determine a first subset of the plurality of electrodes based on the magnitudes. For example, based on an input object 1602 being closer in proximity to the electrode y2 as compared to the other electrodes, the electrode y2 may obtain a resulting signal that is greater in magnitude than the other electrodes on the y-axis. Similarly, the electrode x6 may obtain a resulting signal that is greater in magnitude than the other electrodes on the x-axis. This is shown in the profiles 1608, 1610, 1622, and 1624. Thus, based on the magnitudes of the first resulting signals (e.g., from the profiles 1608, 1610, 1622, and 1624), the processing system 110 may determine a first subset of the plurality of electrodes (e.g., the electrodes y2 and x6).

In other words, at blocks 1702-1706, the processing system 110 may perform spatial low frequency scans and/or tracking scans to obtain information indicating an input object state (e.g., a location of the input object 1602). Then, as will be described below in blocks 1708-1710, the processing system 110 may perform a cis-capacitance adaptive sensing scheme.

At block 1708, the processing system 110 drives one or more of the first subset of the plurality of electrodes to generate second sensing signals that are detectable by a second subset of the plurality of electrodes. The one or more of the first subset of the plurality of electrodes are on a same axis as the second subset of the plurality of electrodes. At block 1710, the processing system 110 obtains second resulting signals associated with the second sensing signals via the second subset of the plurality of electrodes.

For example, as mentioned above, for a cis-capacitance sensing scheme, one or more electrodes are driven such as the electrode y2 from FIG. 16A and resulting signals may be obtained from the other electrodes that are on a same axis as the driven electrode (e.g., the electrodes y0-y11). Additionally, and/or alternatively, the electrode x6 from the first subset of electrodes may be driven, and resulting signals may be obtained from the other electrodes that are on a same axis as the driven electrode (e.g., the electrodes x0-x17). Thus, instead of driving each and every electrode as mentioned above, the processing system 110 may perform block 1706 to determine the first subset of electrodes (e.g., the electrodes y2 and x6), drive only those electrodes, and measure the response observed by all of the other electrodes that are in the same axis as the driven electrode (e.g., electrodes y0-y11 when the electrode y2 is being driven and electrodes x0-x17 when electrode x6 is being driven).

In some embodiments, in addition to driving one or more of the electrodes from the first subset of electrodes, the processing system 110 may further drive another electrode that is not part of the first subset of electrodes, but is still within the same axis as the driven electrode. For example, in order to minimize touch-to-display interference, the processing system 110 may drive a second electrode that did not previously detect an input object (e.g., the input objects 1602 and 1604). The second electrode may be driven with an opposite phase/polarity as the phase/polarity of the electrode within the first subset of electrodes. For instance, at block 1708, the processing system 110 may drive a first electrode from the first subset of electrodes (e.g., the electrode y2) with a first phase/polarity (e.g., a positive signal) and may further drive a second electrode that is not part of the first subset of electrodes (e.g., the electrode y10) with a second phase/polarity (e.g., a negative signal). The processing system 110 may obtain resulting signals from the same axis as the driven electrodes (e.g., obtain resulting signals the electrodes y0-y11 based on driving the electrodes y2 and y10).

In some examples, based on using the cis-capacitance sensing scheme, the processing system 110 may determine whether the input device 100 is in an LGM condition. Furthermore, based on detecting whether the input device 100 is in an LGM condition, the processing system 110 may perform one or more mitigation techniques, which may be described in the '848 Patent.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for performing a scanning process using adaptive scanning, comprising:
    driving, by a processing system of an input device, one or more of a first set of electrodes to generate first sensing signals that are detectable by a second set of electrodes, wherein the first set of electrodes are bar electrodes that are positioned across a first axis and the second set of electrodes are bar electrodes that are positioned across a second axis that is different from the first axis;
    obtaining, by the processing system, first resulting signals associated with the first sensing signals via the second set of electrodes;
    determining, by the processing system and based on the first resulting signals, a first subset of the second set of electrodes that detected an input object;
    driving, by the processing system, one or more of the first subset of the second set of electrodes that detected the input object to generate second sensing signals that are detectable by the first set of electrodes; and
    obtaining, by the processing system, second resulting signals associated with the second sensing signals via the first set of electrodes.

2. The method of claim 1, wherein driving the one or more of the first subset of the second set of electrodes that detected the input object is based on using a code division multiplexing (CDM) coding scheme that uses a plurality of scans, wherein the plurality of scans comprises one or more initial scans and a final scan, and wherein obtaining the second resulting signals comprises obtaining a profile for the first set of electrodes that is based on the one or more initial scans and the final scan.

3. The method of claim 2, wherein driving the one or more of the first subset of the second set of electrodes using the CDM coding scheme comprises:
    during a first initial scan of the one or more initial scans, providing a first type of signal to a first electrode from the first subset of the second set of electrodes and a second type of signal to a second electrode from the first subset of the second set of electrodes; and
    during the final scan, providing the first type of signal to a third electrode from the first subset of the second set of electrodes and the second type of signal to a reference electrode of the second set of electrodes, wherein the reference electrode is not an electrode within the first subset of the second set of electrodes.

4. The method of claim 3, wherein driving the one or more of the first subset of the second set of electrodes using the CDM coding scheme further comprises:
    during a second initial scan of the one or more initial scans, providing the first type of signal to the second electrode from the first subset of the second set of electrodes and the second type of signal to the third electrode from the first subset of the second set of electrodes.

5. The method of claim 2, wherein at each scan of the plurality of scans, a single electrode of the first subset of electrodes is driven to generate a first type of sensing signal and other electrodes from the first subset of electrodes are driven to generate a second type of sensing signal that is different from the first type.

6. The method of claim 5, further comprising:
    determining one or more additional subsets of electrodes from the second set of electrodes; and
    while driving the first subset using the CDM coding scheme, statically driving the one or more additional subsets of electrodes to consistently generate the first type of sensing signal or the second type of sensing signal.

7. The method of claim 6, wherein determining the one or more additional subsets of electrodes from the second set of electrodes comprises determining a second subset of electrodes and a third subset of electrodes, and wherein statically driving the one or more additional subsets of electrodes comprises:
    statically driving the second subset of electrodes to consistently generate the first type of sensing signal while driving the first subset using the CDM coding scheme; and
    statically driving the third subset of electrodes to consistently generate the second type of sensing signal while driving the first subset using the CDM coding scheme.

8. The method of claim 7, wherein the second resulting signals indicate detection of the input object and one or more additional input objects.

9. The method of claim 7, further comprising:

based on the second resulting signals, driving, by the processing system, the first set of electrodes to generate third sensing signals that are detectable by the second set of electrodes; and obtaining, by the processing system, third resulting signals associated with the third sensing signals via the second set of electrodes.

10. The method of claim 9, wherein driving the first set of electrodes to generate the third sensing signals comprises:

driving a first subset of the first set of electrodes using the CDM coding scheme;

statically driving a second subset of the first set of electrodes to consistently generate the first type of sensing signal while driving the first subset of the first set of electrodes using the CDM coding scheme; and statically driving the third subset of the first set of electrodes to consistently generate the second type of sensing signal while driving the first subset of the first set of electrodes using the CDM coding scheme.

11. The method of claim 5, further comprising:

based on the second resulting signals, determining that one or more electrodes from the first subset of the second set of electrodes no longer detect the input object;

removing the one or more electrodes from the first subset to generate an updated first subset of the second set of electrodes;

driving the updated first subset of the second set of electrodes to generate third sensing signals; and obtaining third resulting signals associated with the third sensing signals via the first set of electrodes.

12. The method of claim 1, further comprising:

driving, by the processing system, a second subset of the first set of electrodes based on the second resulting signals to generate third sensing signals that are detectable by the second set of electrodes;

obtaining, by the processing system, third resulting signals associated with the third sensing signals via the second set of electrodes;

determining, by the processing system and based on the third resulting signals, a third subset of the second set of electrodes that detected the input object; and driving, by the processing system, one or more of the third subset of the second set of electrodes that detected the input object.

13. The method of claim 12, wherein determining the third subset of the second set of electrodes that detected the input object comprises:

comparing the first resulting signals and the third resulting signals to generate delta signals; and determining the third subset of the second set of electrodes based on the delta signals.

14. The method of claim 13, wherein determining the third subset of the second set of electrodes comprises determining the third subset of the second set of electrodes based on applying one or more high-pass filters to the delta signals.

15. The method of claim 1, further comprising:

incorporating, by the processing system, a modulation reference electrode from the second set of electrodes into the first subset, wherein the modulation reference electrode did not detect the input object, and wherein driving the one or more of the first subset of the second set of electrodes comprises driving the first subset of the second set of electrodes that includes the modulation reference electrode.

16. An input device for performing a scanning process using adaptive scanning, comprising:

a first set of electrodes that are bar electrodes that are positioned across a first axis;

a second set of electrodes that are bar electrodes that are positioned across a second axis that is different from the first axis; and a processing system configured to:

drive one or more of the first set of electrodes to generate first sensing signals that are detectable by the second set of electrodes;

obtain first resulting signals associated with the first sensing signals via the second set of electrodes;

determine, based on the first resulting signals, a first subset of the second set of electrodes that detected an input object;

drive one or more of the first subset of the second set of electrodes that detected the input object to generate second sensing signals that are detectable by the first set of electrodes; and obtain second resulting signals associated with the second sensing signals via the first set of electrodes.

17. The input device of claim 16, wherein driving the one or more of the first subset of the second set of electrodes that detected the input object is based on using a code division multiplexing (CDM) coding scheme that uses a plurality of scans, wherein the plurality of scans comprises one or more initial scans and a final scan, and wherein obtaining the second resulting signals comprises obtaining a profile for the first set of electrodes that is based on the one or more initial scans and the final scan.

18. The input device of claim 17, wherein driving the one or more of the first subset of the second set of electrodes using the CDM coding scheme comprises:

during a first initial scan of the one or more initial scans, providing a first type of signal to a first electrode from the first subset of the second set of electrodes and a second type of signal to a second electrode from the first subset of the second set of electrodes; and during the final scan, providing the first type of signal to a third electrode from the first subset of the second set of electrodes and the second type of signal to a reference electrode of the second set of electrodes, wherein the reference electrode is not an electrode within the first subset of the second set of electrodes.

19. The input device of claim 18, wherein driving the one or more of the first subset of the second set of electrodes using the CDM coding scheme further comprises:

during a second initial scan of the one or more initial scans, providing the first type of signal to the second electrode from the first subset of the second set of electrodes and the second type of signal to the third electrode from the first subset of the second set of electrodes.

20. A non-transitory computer-readable medium having processor-executable instructions stored thereon, the processor-executable instructions, when executed, facilitating performance of the following:

driving one or more of a first set of electrodes to generate first sensing signals that are detectable by a second set of electrodes, wherein the first set of electrodes are bar electrodes that are positioned across a first axis and the second set of electrodes are bar electrodes that are positioned across a second axis that is different from the first axis;

obtaining first resulting signals associated with the first sensing signals via the second set of electrodes;

determining, based on the first resulting signals, a first subset of the second set of electrodes that detected an input object;

driving one or more of the first subset of the second set of electrodes that detected the input object to generate second sensing signals that are detectable by the first set of electrodes; and obtaining second resulting signals associated with the second sensing signals via the first set of electrodes.

* * * * *